(12) United States Patent
Rhoads et al.

(10) Patent No.: US 7,171,018 B2
(45) Date of Patent: *Jan. 30, 2007

(54) PORTABLE DEVICES AND METHODS EMPLOYING DIGITAL WATERMARKING

(75) Inventors: Geoffrey B. Rhoads, West Linn, OR (US); Bruce L. Davis, Lake Oswego, OR (US); Douglas B. Evans, San Francisco, CA (US)

(73) Assignee: Digimarc Corporation, Beaverton, OR (US)

( * ) Notice: Subject to any disclaimer, the term of this patent is extended or adjusted under 35 U.S.C. 154(b) by 311 days.

This patent is subject to a terminal disclaimer.

(21) Appl. No.: 10/147,228

(22) Filed: May 15, 2002

(65) Prior Publication Data

US 2003/0012403 A1 Jan. 16, 2003

Related U.S. Application Data

(63) Continuation-in-part of application No. 09/769,017, filed on Jan. 24, 2001, now Pat. No. 6,829,368, and a continuation-in-part of application No. 09/670,115, filed on Sep. 26, 2000, now abandoned, which is a continuation-in-part of application No. 09/563,664, filed on May 2, 2000, now Pat. No. 6,505,160, application No. 10/147,228, and a continuation-in-part of application No. 09/563,664, filed on May 2, 2000, now Pat. No. 6,505,160, which is a continuation-in-part of application No. 09/476,686, filed on Dec. 30, 1999, said application No. 09/563,664 is a continuation-in-part of application No. 08/746,613, filed on Nov. 12, 1996, now Pat. No. 6,122,403, which is a continuation-in-part of application No. 08/649,419, filed on May 16, 1996, now Pat. No. 6,862,260, and a continuation-in-part of application No. PCT/US96/06618, filed on May 7, 1996, and a continuation-in-part of application No. 08/508,083, filed on Jul. 27, 1995, now Pat. No. 5,841,978, application No. 10/147,228, and a continuation-in-part of application No. 09/504,239, filed on Feb. 15, 2000, now Pat. No. 6,965,682, which is a continuation-in-part of application No. 09/491,534, filed on Jan. 26, 2000, now abandoned, application No. 10/147,228, and a continuation-in-part of application No. 09/640,806, filed on Aug. 17, 2000, now Pat. No. 6,438,231, and a continuation-in-part of application No. 09/473,396, filed on Dec. 28, 1999, now Pat. No. 6,577,746, which is a continuation of application No. 09/169,088, filed on Oct. 8, 1998, now Pat. No. 6,111,954, which is a continuation of application No. 08/637,531, filed on Apr. 25, 1996, now Pat. No. 5,822,436, application No. 10/147,228, and a continuation-in-part of application No. 09/571,422, filed on May 15, 2000, now Pat. No. 6,947,571, which is a continuation-in-part of application No. 09/343,104, filed on Jun. 29, 1999, now abandoned.

(60) Provisional application No. 60/531,076, filed on Mar. 18, 2000, provisional application No. 60/178,028, filed on Jan. 26, 2000, provisional application No. 60/163,332, filed on Nov. 3, 1999, provisional application No. 60/134,782, filed on May 19, 1999.

(51) Int. Cl.
*G06K 9/00* (2006.01)
(52) U.S. Cl. .................... 382/100; 704/270
(58) Field of Classification Search .............. 382/100, 382/232; 713/176; 381/73.1; 348/960; 704/270

See application file for complete search history.

(56) References Cited

U.S. PATENT DOCUMENTS

| | | |
|---|---|---|
| 3,845,391 A | 10/1974 | Crosby |
| 3,984,624 A | 10/1976 | Waggener |
| 4,238,849 A | 12/1980 | Gassmann |
| 4,313,197 A | 1/1982 | Maxemchuk |
| 4,367,488 A | 1/1983 | Leventer et al. |
| 4,379,947 A | 4/1983 | Warner |
| 4,380,027 A | 4/1983 | Leventer et al. |
| 4,395,600 A | 7/1983 | Lundy et al. |

| Patent No. | Date | Inventor(s) |
|---|---|---|
| 4,425,642 A | 1/1984 | Moses et al. |
| 4,528,588 A | 7/1985 | Löfberg |
| 4,547,804 A | 10/1985 | Greenberg |
| 4,672,605 A | 6/1987 | Hustig et al. |
| 4,675,746 A | 6/1987 | Tetrick et al. |
| 4,750,173 A | 6/1988 | Blüthgen |
| 4,807,031 A | 2/1989 | Broughton et al. |
| 4,855,827 A | 8/1989 | Best |
| 4,888,798 A | 12/1989 | Earnest |
| 4,908,836 A | 3/1990 | Rushforth et al. |
| 4,947,028 A | 8/1990 | Gorog |
| 4,969,041 A | 11/1990 | O'Grady et al. |
| 4,977,594 A | 12/1990 | Shear |
| 5,023,907 A | 6/1991 | Johnson |
| 5,053,956 A | 10/1991 | Donald et al. |
| 5,103,459 A | 4/1992 | Gilhousen et al. |
| 5,113,518 A | 5/1992 | Durst |
| 5,138,712 A | 8/1992 | Corbin |
| 5,146,457 A | 9/1992 | Veldhuis et al. |
| 5,187,750 A | 2/1993 | Behera |
| 5,210,820 A | 5/1993 | Kenyon |
| 5,243,423 A | 9/1993 | DeJean et al. |
| 5,262,860 A | 11/1993 | Fitzpatrick |
| 5,288,976 A | 2/1994 | Citron |
| 5,304,786 A | 4/1994 | Pavlidis et al. |
| 5,315,098 A | 5/1994 | Tow |
| 5,319,735 A | 6/1994 | Preuss et al. |
| 5,385,371 A | 1/1995 | Izawa |
| 5,428,731 A | 6/1995 | Powers |
| 5,463,209 A | 10/1995 | Figh |
| 5,486,686 A | 1/1996 | Zdybel, Jr. et al. |
| 5,493,677 A | 2/1996 | Balogh |
| 5,495,411 A | 2/1996 | Ananda |
| 5,495,581 A | 2/1996 | Tsai |
| 5,496,071 A | 3/1996 | Walsh |
| 5,502,576 A | 3/1996 | Ramsay et al. |
| 5,524,933 A | 6/1996 | Kunt et al. |
| 5,530,852 A | 6/1996 | Meske |
| 5,548,645 A | 8/1996 | Ananda |
| 5,553,143 A | 9/1996 | Ross |
| 5,572,653 A | 11/1996 | DeTemple et al. |
| 5,574,519 A | 11/1996 | Manico et al. |
| 5,574,962 A | 11/1996 | Fardeau et al. |
| 5,579,124 A | 11/1996 | Aijala et al. |
| 5,579,479 A | 11/1996 | Plum |
| 5,581,800 A | 12/1996 | Fardeau et al. |
| 5,584,070 A | 12/1996 | Harris et al. |
| 5,613,004 A | 3/1997 | Cooperman |
| 5,629,980 A | 5/1997 | Stefik |
| 5,634,012 A | 5/1997 | Stefik |
| 5,636,276 A | 6/1997 | Brugger |
| 5,638,443 A | 6/1997 | Stefik |
| 5,640,193 A | 6/1997 | Wellner |
| 5,640,467 A | 6/1997 | Yamashita et al. |
| 5,646,997 A | 7/1997 | Barton |
| 5,646,999 A | 7/1997 | Saito |
| 5,652,626 A | 7/1997 | Kawakami et al. |
| 5,652,714 A | 7/1997 | Peterson |
| 5,657,462 A | 8/1997 | Brouwer |
| 5,659,164 A | 8/1997 | Schmid |
| 5,663,766 A | 9/1997 | Sizer, II |
| 5,665,951 A | 9/1997 | Newman et al. |
| 5,668,636 A | 9/1997 | Beach et al. |
| 5,671,282 A | 9/1997 | Wolff et al. |
| 5,673,316 A | 9/1997 | Auerbach et al. |
| 5,680,223 A | 10/1997 | Cooper et al. |
| 5,687,236 A | 11/1997 | Moskowitz et al. |
| 5,692,073 A | 11/1997 | Cass |
| 5,715,403 A | 2/1998 | Stefik |
| 5,717,940 A | 2/1998 | Peairs et al. |
| 5,721,788 A | 2/1998 | Powell |
| 5,734,119 A | 3/1998 | France |
| 5,742,845 A | 4/1998 | Wagner |
| 5,761,686 A | 6/1998 | Bloomberg |
| 5,765,152 A | 6/1998 | Erickson |
| 5,765,176 A | 6/1998 | Bloomberg |
| 5,774,452 A | 6/1998 | Wolosewicz |
| 5,778,102 A | 7/1998 | Sandford, II et al. |
| 5,781,914 A | 7/1998 | Stork et al. |
| 5,801,687 A | 9/1998 | Peterson |
| 5,804,803 A * | 9/1998 | Cragun et al. ............ 235/375 |
| 5,806,005 A * | 9/1998 | Hull et al. ................ 455/556 |
| 5,809,317 A | 9/1998 | Kogan |
| 5,818,441 A | 10/1998 | Throckmorton |
| 5,822,432 A | 10/1998 | Moskowitz et al. |
| 5,822,436 A | 10/1998 | Rhoads |
| 5,828,325 A | 10/1998 | Wolosewicz et al. |
| 5,838,458 A | 11/1998 | Tsai |
| 5,841,978 A | 11/1998 | Rhoads |
| 5,845,281 A | 12/1998 | Benson |
| 5,848,413 A | 12/1998 | Wolff |
| 5,848,424 A | 12/1998 | Scheinkman |
| 5,852,673 A | 12/1998 | Young |
| 5,857,038 A | 1/1999 | Owada et al. |
| 5,866,888 A | 2/1999 | Bravman et al. |
| 5,872,589 A | 2/1999 | Morales |
| 5,880,453 A | 3/1999 | Wang et al. |
| 5,892,900 A | 4/1999 | Ginter et al. |
| 5,893,908 A | 4/1999 | Cullen et al. |
| 5,893,910 A | 4/1999 | Martineau |
| 5,900,608 A | 5/1999 | Iida |
| 5,905,248 A | 5/1999 | Russell et al. |
| 5,915,027 A | 6/1999 | Cox et al. |
| 5,918,223 A | 6/1999 | Blum et al. |
| 5,920,861 A | 7/1999 | Hall et al. |
| 5,920,878 A | 7/1999 | DeMont |
| 5,926,822 A | 7/1999 | Garman |
| 5,930,767 A | 7/1999 | Reber et al. |
| 5,932,862 A | 8/1999 | Hussey et al. |
| 5,932,863 A * | 8/1999 | Rathus et al. .......... 235/426.15 |
| 5,933,829 A | 8/1999 | Durst et al. |
| 5,938,726 A | 8/1999 | Reber et al. |
| 5,938,727 A | 8/1999 | Ikeda |
| 5,940,595 A | 8/1999 | Reber et al. |
| 5,942,741 A | 8/1999 | Longacre, Jr. et al. |
| 5,971,277 A | 10/1999 | Cragun et al. |
| 5,974,141 A | 10/1999 | Saito |
| 5,974,548 A | 10/1999 | Adams |
| 5,978,477 A | 11/1999 | Hull et al. |
| 5,978,773 A | 11/1999 | Hudetz et al. |
| 5,982,956 A | 11/1999 | Lahmi |
| 5,983,218 A | 11/1999 | Syeda-Mahmood |
| 5,986,651 A | 11/1999 | Reber et al. |
| 5,991,737 A | 11/1999 | Chen |
| 5,991,876 A | 11/1999 | Johnson et al. |
| 5,995,105 A | 11/1999 | Reber et al. |
| 5,995,978 A | 11/1999 | Cullen et al. |
| 6,006,226 A | 12/1999 | Cullen et al. |
| 6,035,035 A * | 3/2000 | Firooz ........................ 379/433 |
| 6,052,486 A | 4/2000 | Knowlton et al. |
| 6,061,686 A | 5/2000 | Gauvin et al. |
| 6,064,737 A | 5/2000 | Rhoads |
| 6,081,629 A | 6/2000 | Browning |
| 6,081,827 A | 6/2000 | Reber et al. |
| 6,084,528 A | 7/2000 | Beach et al. |
| 6,085,205 A | 7/2000 | Peairs et al. |
| 6,098,106 A | 8/2000 | Philyaw et al. |
| 6,108,656 A | 8/2000 | Durst et al. |
| 6,122,403 A * | 9/2000 | Rhoads ....................... 382/233 |
| 6,122,526 A * | 9/2000 | Parulski et al. ............. 455/556 |
| 6,128,012 A * | 10/2000 | Seidensticker, Jr. et al. .................... 345/336 |
| 6,151,208 A * | 11/2000 | Bartlett ....................... 361/683 |
| 6,161,131 A * | 12/2000 | Garfinkle .................... 709/206 |
| 6,164,534 A | 12/2000 | Rathus et al. |
| 6,182,090 B1 | 1/2001 | Peairs |

| | | | |
|---|---|---|---|
| 6,199,073 B1 | 3/2001 | Peairs et al. | |
| 6,199,076 B1 | 3/2001 | Logan et al. | |
| 6,243,480 B1* | 6/2001 | Zhao et al. | 382/100 |
| 6,278,781 B1 | 8/2001 | Rhoads | |
| 6,278,884 B1* | 8/2001 | Kim | 455/556 |
| 6,282,362 B1 | 8/2001 | Murphy et al. | |
| 6,286,036 B1 | 9/2001 | Rhoads | |
| 6,300,880 B1* | 10/2001 | Sitnik | 340/825.25 |
| 6,311,214 B1 | 10/2001 | Rhoads | |
| 6,314,457 B1 | 11/2001 | Schena et al. | |
| 6,317,639 B1* | 11/2001 | Hansen | 700/83 |
| 6,324,573 B1 | 11/2001 | Rhoads | |
| 6,334,721 B1 | 1/2002 | Horigane | |
| 6,345,104 B1 | 2/2002 | Rhoads | |
| 6,351,815 B1 | 2/2002 | Adams | |
| 6,389,151 B1 | 5/2002 | Carr et al. | |
| 6,408,331 B1 | 6/2002 | Rhoads | |
| 6,411,725 B1 | 6/2002 | Rhoads | |
| 6,439,465 B1 | 8/2002 | Bloomberg | |
| 6,449,377 B1 | 9/2002 | Rhoads | |
| 6,505,160 B1* | 1/2003 | Levy et al. | 704/210 |
| 6,522,769 B1 | 2/2003 | Rhoads et al. | |
| 6,522,770 B1 | 2/2003 | Seder et al. | |
| 6,542,927 B2 | 4/2003 | Rhoads | |
| 6,549,638 B2 | 4/2003 | Davis et al. | |
| 6,577,746 B1 | 6/2003 | Evans et al. | |
| 6,608,919 B1 | 8/2003 | Alattar | |
| 6,614,914 B1 | 9/2003 | Rhoads et al. | |
| 6,931,451 B1 | 8/2005 | Logan et al. | |
| 6,941,275 B1 | 9/2005 | Swierczek | |
| 6,973,669 B2 | 12/2005 | Daniels | |
| 2001/0001854 A1 | 5/2001 | Schena et al. | |
| 2001/0016852 A1 | 8/2001 | Peairs et al. | |
| 2001/0023193 A1 | 9/2001 | Rhoads | |
| 2001/0031066 A1* | 10/2001 | Meyer et al. | 382/100 |
| 2001/0032251 A1 | 10/2001 | Rhoads et al. | |
| 2001/0037313 A1 | 11/2001 | Lofgren et al. | |
| 2001/0039546 A1* | 11/2001 | Moore et al. | 707/10 |
| 2001/0043362 A1 | 11/2001 | Hull et al. | |
| 2001/0051996 A1 | 12/2001 | Cooper et al. | |
| 2001/0055391 A1 | 12/2001 | Jacobs | |
| 2002/0031240 A1 | 3/2002 | Levy et al. | |
| 2002/0032698 A1 | 3/2002 | Cox | |
| 2002/0037091 A1 | 3/2002 | Terasaki | |
| 2002/0048369 A1 | 4/2002 | Ginter et al. | |
| 2003/0050967 A1 | 3/2003 | Rhoads et al. | |
| 2003/0072467 A1 | 4/2003 | Brundage et al. | |
| 2005/0043018 A1 | 2/2005 | Kawamoto | |

FOREIGN PATENT DOCUMENTS

| | | | |
|---|---|---|---|
| EP | 493091 | | 7/1992 |
| EP | 930770 | | 7/1999 |
| EP | 0930770 | A2 * | 7/1999 |
| JP | 8-50598 | | 2/1996 |
| WO | WO95/14289 | | 5/1995 |
| WO | WO95/20291 | | 7/1995 |
| WO | WO96/27259 | | 9/1996 |
| WO | WO96/36163 | | 11/1996 |
| WO | WO97/43736 | | 11/1997 |
| WO | WO 97/43736 | * | 11/1997 |
| WO | WO98/03923 | | 1/1998 |
| WO | WO98/20642 | | 5/1998 |
| WO | WO98/24050 | | 6/1998 |
| WO | WO98/20411 | | 5/1999 |
| WO | WO99/34277 | | 7/1999 |

OTHER PUBLICATIONS

Ericsson, RD 4180154 dated Feb. 10, 1999. (RD stands for Research Disclosure).*
U.S. Appl. No. 09/342,688, filed June 29, 1999, Rodriguez et al.
U.S. Appl. No. 09/343,104, filed June 29, 1999, Rodriguez et al.
U.S. Appl. No. 09/452,021, filed Nov. 30, 1999, Davis et al.
U.S. Appl. No. 09/504,239, filed Feb. 15, 2000, Davis et al.
U.S. Appl. No. 09/571,422, filed May 15, 2000, Rhoads et al.
U.S. Appl. No. 60/000,442, filed Jun. 20, 1995, Hudetz.
Bloomberg, "Embedding Digital Data on Paper in Iconic Text" SPIE vol. 3027, Document Recognition IV, pp. 67-80 (1997).
Bruckstein, A.M.; Richardson, T.J., A holographic transform domain image watermarking method, Circuits, Systems, and Signal Processing vol. 17, No. 3 p. 361-89, 1998. This paper includes an appendix containing an internal memo of Bell Labs, which according to the authors of the paper, was dated Sep. 1994.
"Copyright Protection for Digital Images, Digital Fingerprinting from FBI," Highwater FBI brochure, 1995, 4 pages.
Dautzenberg, "Watermarking Images," Department of Microelectronics and Electrical Engineering, Trinity College Dublin, 47 pages, Oct. 1994.
"High Water FBI Limited Presentation Image Copyright Protection Software," FBI Ltd brochure, Jul. 1995, 17 pages.
Johnson, et al., "Bridging the Paper and Electronic Worlds: The Paper User Interface", Interchi '93, pp. 507-512, Apr. 1993.
Kurak et al., "A Cautionary Note On Image Downgrading," 1992 IEEE, pp. 153-159.
Mintzer et al., "Safeguarding Digital library Contents and Users" Digital Watermarking, D-Lib Magazine, Dec. 1997: ISSN 1082-9873.
Newman, William, et al. "A Desk Supporting Computer-Based Interaction with paper Documents," ACM Conference on Human Factors in Computing Systems (CHI '92) May 3-7, 1992, pp. 587-592.
Peairs, "Iconic Paper," Proceedings of the Third International Conference on Document Analysis and Recognition (ICDAR '95), pp. 1174-1179, 1995.
Rao, et al. "Protofoil: Storing and Finding the Information Worker's Paper Documents in an Electronic File Cabinet," Human Factors in Computing Systems (CHI '94), pp. 180-186, Boston, MA, Apr. 1994.
Szepanski, "A Signal Theoretic Method for Creating Forgery-Proof Documents for Automatic Verification," Proceedings 1979 Carnahan Conference on Crime Countermeasures, May 16, 1979, pp. 101-109.
Szepanski, "Additive Binary Data Transmission for Video Signals," Papers Presented at Conf. Of Comm. Engineering Soc. Sep. 30-Oct. 3, 1980, Technical Reports vol. 74, pp. 342-352.
Tirkel et al., "Electronic Water Mark," DICTA-93, Macquarie University, Sydney, Australia, Dec. 1993, pp. 666-673.
Whittaker, et al., "Back to the Future: Pen and Paper Technology Supports Complex Group Coordination," CHI '95, Conference on Human Factors in Computing Systems, Denver, Colorado (May 7-11, 1995).
Zhao, "WWW Copyright Labeling & Verification", (URL: http://sagittarius.igd.fhg.de:64325), Fraunhofer-IGD, Wilhelminenstr.7, D-64283 Darmstadt, 1 page.
Zhao, "A WWW Service to Embed and Prove Digital Copyright Watermarks," Proc. Of the European Conference on Multimedia Applications, Services and Techniques, Louvain-La-Neuve, Belgium, May 1996, 15 pages.
Ericsson, RD 4180154 dated Feb. 10, 1999.
U.S. Appl. No. 09/476,686, filed Dec. 30, 1999, Rhoads et al.
U.S. Appl. No. 09/531,076, filed Mar. 18, 2000, Rhoads et al.
U.S. Appl. No. 09/562,517, filed May 1, 2000, Davis et al.
Aust, D., "Augmenting Paper Documents with Digital Information in a Mobile Environment," MS Thesis, University of Dortmund, Department of Computer Graphics, Sep. 3, 1996.
Arai et al., "Retrieving Electronic Documents with Real-World Objects on InteractiveDESK," UIST '95, Nov. 14, 1995.
Arai, InteractiveDESK: A Computer-Augmented Desk Which Responds to Operations on Real Objects, CHI 95, May 7, 1995.
Worring, "Hyperdocument Generation Using OCR and Icon Detection," Proc. 3d Int. Conf. on Doc. Analysis and Recognition, Aug. 14, 1995.
Ghias et al, Query by Humming: Musical Information Retrieval In An Audio Database. In ACM Multimedia, pp. 231-236, Nov. 1995.
Kageyama et al, Melody Retrieval with Humming, Proceedings of Int. Computer Music Conference (ICMC), 1993.

Muscle Fish press release, Muscle Fish's Audio Search Technology to be Encapsulated into Informix Datablade Module, Jul. 10, 1996.
Wold et al, Content-Based Classification, Search, and Retrieval of Audio, IEEE Multimedia Magazine, Fall, 1996.

\* cited by examiner

*Primary Examiner*—Samir Ahmed
(74) *Attorney, Agent, or Firm*—Digimarc Corporation

(57) ABSTRACT

Media objects are transformed into active, connected objects via identifiers embedded into them or their containers. In the context of a user's playback experience, a decoding process extracts the identifier from a media object and possibly additional context information and forwards it to a server. The server, in turn, maps the identifier to an action, such as returning metadata, re-directing the request to one or more other servers, requesting information from another server to identify the media object, etc. The server may return a higher fidelity version of content from which the identifier was extracted. In some applications, the higher fidelity version may be substituted for the original media object and rendered to provide higher quality output. The linking process applies to broadcast objects as well as objects transmitted over networks in streaming and compressed file formats.

32 Claims, 7 Drawing Sheets

PORTABLE DEVICES AND METHODS EMPLOYING DIGITAL WATERMARKING

RELATED APPLICATION DATA

This patent application is a continuation in part of U.S. patent application Ser. No. 09/670,115, filed Sep. 26, 2000 (Now abandoned). This patent application also is a continuation in part of U.S. patent application Ser. No. 09/769,017, filed Jan. 24, 2001 (Now U.S. Pat. No. 6,829,368), which is a continuation in part of U.S. patent application Ser. No. 09/563,664, filed May 2, 2000 (now U.S. Pat. No. 6,505,160), and which claims the benefit of U.S. Provisional Application No. 60/178,028, filed Jan. 26, 2000. This patent application is also a continuation in part of U.S. patent application Ser. No. 09/563,664, filed May 2, 2000 now U.S. Pat. No. 6,505,160, which is a continuation in part of U.S. patent application Ser. No. 09/476,686, filed Dec. 30, 1999, which claims priority to U.S. Provisional Application No. 60/134,782, filed May 19, 1999. application Ser. No. 09/563,664 is also a continuation in part of U.S. patent application Ser. No. 08/746,613 filed Nov. 12, 1996 (now U.S. Pat. No. 6,122,403), which is a continuation in part of U.S. patent application Ser. No. 08/649,419, filed May 16, 1996 (now U.S. Pat. No. 5,862,260), PCT Application PCT/US96/06618, filed May 7, 1996, and U.S. patent application Ser. No. 08/508,083, filed Jul. 27, 1995 (now U.S. Pat. No. 5,841,978). This patent application is also a continuation in part of 09/504,239, filed Feb. 15, 2000 (Now U.S. Pat No. 6,965,682), which is a continuation in part of U.S. Application Ser. No. 09/491,534, filed Jan. 26, 2000 (now abandoned). This patent application is also a continuation in part of U.S. Application Ser. No. 09/473,396, filed Dec. 28, 1999 (now U.S. Pat. No. 6,577,746). This patent application is also a continuation in part of Ser. No. 09/640,806, filed Aug. 17, 2000 (now U.S. Pat. No. 6,438,231, which is a continuation of of application Ser. No. 09/169,088, filed Oct. 8, 1998, (now U.S. Pat. No. 6,111,954), which is a continuation in part application Ser. No. 08/637,531, filed Apr. 25, 1996, (now U.S. Pat. No. 5,822,436). This patent application is also a continuation in part of application Ser. No. 09/571,422, filed May 15, 2000 (Now U.S. Pat No. 6,947,571), which is a continuation in part of application Ser. No. 09/343,104, filed Jun. 29, 1999 (now abandoned), and which claims the benefit of application No. 60/163,332, filed Nov. 3, 1999.

These applications are hereby incorporated by reference.

The subject matter of the present application is related to that disclosed in PCT Applications Nos. WO 01/01331 A1, published Jan. 4, 2001, and WO 00/70585, published Nov. 23, 2000; and in U.S. patent application Ser. No. 09/292,569, filed Apr. 15, 1999; Ser. No. 09/343,104, filed Jun. 29, 1999; Ser. No. 09/503,881, filed Feb. 14,2000 (now U.S. Pat. No. 6,614,914); Ser. No. 09/525,865, filed March 15, 2000 (Now U.S. Pat. No. 6,611,607); Ser. No. 09/547,664, filed Apr. 12, 2000; Ser. No. 09/574,726, filed May 18, 2000, Ser. No. 09/636,102, filed Aug. 10, 2000; and Provisional Application No. 60/191,778, filed March 24, 2000. Each of these documents is hereby incorporated by reference.

TECHNICAL FIELD

The invention relates to linking audio and other multimedia data objects with metadata and actions via a communication network, e.g., computer, broadcast, wireless, etc.

BACKGROUND AND SUMMARY

Developments in network technology and media content (e.g., images, video, and audio) storage, delivery, and playback are re-shaping the entertainment, information technology, and consumer electronics industries. With these developments, there are an increasing number of applications for associating media content with auxiliary data. The auxiliary data may provide information describing the content, copy control information or instructions, links to related content, machine instructions, etc. This auxiliary data is sometimes referred to as metadata. In many applications, metadata suffers from the drawback that it is vulnerable to becoming separated from an associated media signal.

Steganography provides a way to embed data in the media signal. As such, it offers an advantage over conventional ways to associate metadata with media signals. Examples of steganography include digital watermarking and data glyphs. Exemplary watermarking techniques suitable for still image and video content are shown in U.S. U.S. Pat. No. 5,862,260 to Rhoads and U.S. Pat. No. 5,915,027 to Cox. Exemplary watermarking techniques suitable for use with audio content are shown in the just cited Rhoads patent, as well as U.S. Pat. No. 5,945,932 to Smith and U.S. Pat. No. 5,940,135 to Petrovic.

Advances in computer and wireless networking, multimedia coding, and higher bandwidth communication links are creating many new ways to distribute and enjoy multimedia content, such as music and movies. Coding formats for audio like MPEG 1 Layer 3 (MP3) have already caused significant changes in music delivery to consumers. Despite the advances in technology, content distributors and broadcasters still need to address how to effectively promote and sell content.

This document describes systems and processes for linking audio and other multimedia data objects with metadata and actions via a communication network, e.g., computer, broadcast, wireless, etc. Media objects are transformed into active, connected objects via identifiers embedded into them or their containers. These identifiers can be embedded by the owner or distributor of the media object, or automatically created from the media object. In the context of a user's playback experience, a decoding process extracts the identifier from a media object and possibly additional context information and forwards it to a server. The server, in turn, maps the identifier to an action, such as returning metadata, re-directing the request to one or more other servers, requesting information from another server to identify the media object, etc. If the identifier has no defined action, the server can respond with an option for the user to buy the link and control the resulting action for all objects with the current identifier. The linking process applies to broadcast objects as well as objects transmitted over networks in streaming and compressed file formats.

Further features will become apparent with reference to the following detailed description and accompanying drawings.

DETAILED DESCRIPTION

Figure 1:
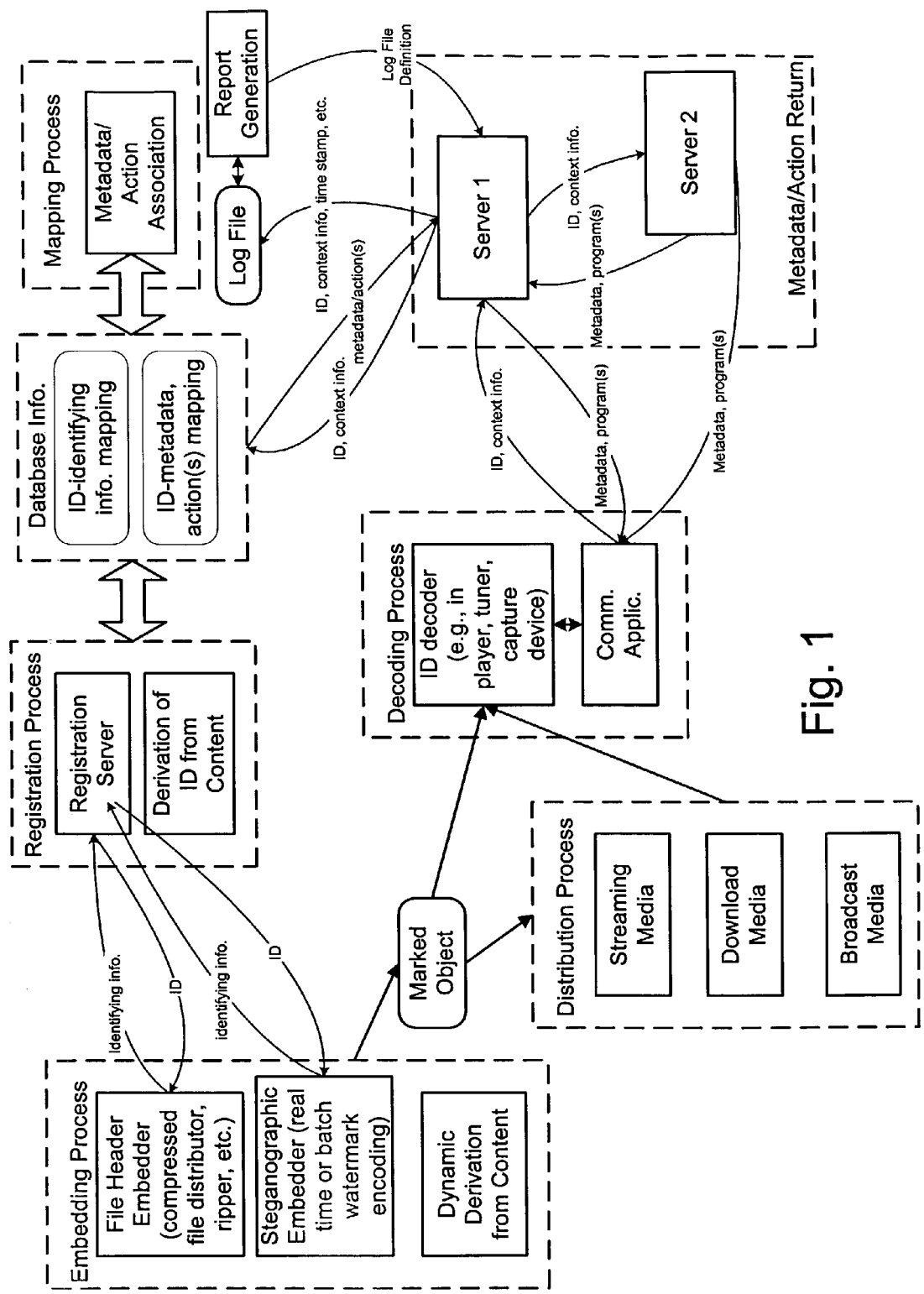
FIG. 1 is a diagram illustrating examples of media object linking processes and systems.

Linking Audio and Other Media Objects Via Identifiers

The following sections describe systems and processes for linking audio and other media objects to metadata and actions via an identifier. For the sake of illustration, the disclosure focuses on a specific media type, namely audio signals (e.g., music, sound tracks of audio visual works, voice recordings, etc.). However, these systems, their components and processes apply to other types of media signals as well, including video, still images, graphical models, etc. As described further below, an identifier attached to an audio signal is used to connect that signal with metadata and/or programmatic or device actions. In the context of this document, the terms "media object" and "audio object" refer to an electronic form of a media signal and audio signal, respectively. The linking of media signals applies to objects that are transmitted over wire networks (such as a computer network), wireless networks (such as a wireless telephone network), and broadcast (AM, FM, digital broadcast, etc.).

There are a number of ways to associate an identifier with an audio object. One way to associate the identifier is to insert it in the form of a numeric or alphanumeric code (e.g., binary or M-ary code) in the electronic file in which the audio is stored. Another way to associate the identifier is to embed it as auxiliary data in the audio signal using steganographic methods, such as digital watermarking or other data hiding techniques. Yet another way is to derive the identifier from the audio signal, the table of contents, the file system structure, or its container (e.g., an electronic file or physical package for data like flash memory, Digital Versatile Disk (DVD), minidisk, or compact disk (CD). The physical media may have identifying characteristics, such as a unique identifier or encoded metadata, or other attributes from which an identifier can be derived (e.g., CD disk wobble).

When the identifier is associated with metadata or actions, it transforms the media object into a "linked" object. The identifier travels with the object through distribution, including in some cases, through physical distribution in packaged media and through electronic distribution (broadcast or network communication). The identifier may travel within the same band as the audio object, such as a watermark, or via a separate band, such as a file header or footer or separate broadcast band. A decoding device or programmatic process extracts the identifier from the object and uses it to retrieve related data or actions ("metadata"). In the case of an audio object, like a song, the metadata typically includes the title, artist, lyrics, copyright owner, sound recording owner, information about buying or sampling opportunities and URLs to this type of data as well as web sites and other programs and devices. Linked actions include device or programmatic processes for electronically establishing a license, transferring content (either streaming or download), sending an email, recording marketing data about a transaction, etc. The identifier allows a fan of a particular type of music or artist to get more information about the music and to buy more music. From the perspective of the artists and record labels, the identifier provides an additional opportunity to promote their music and sell content, concert tickets, etc.

In addition, in some implementations where identifier linking transactions are monitored, it enables the vendors of music to gather data about electronic transactions triggered by the link. For example, users of information may choose to provide information about themselves when they register their decoding device or software with the system. A user ID or other context information may then be recorded when the identifier is extracted and used to trigger a transaction. Many entities involved in the distribution of media signals can benefit from the linking capability. Artists can link their music to information about themselves and provide electronic buying opportunities for music, concert tickets, clothing, etc. Rights holding organizations can use the link to inform users about itself and licensing opportunities. In some cases, the link may also be used to monitor playing and distribution of copies of the music. Record labels can link their music to information about the artist, the label, electronic buying opportunities, etc. Electronic retailers can increase sales by linking users to opportunities to sample and buy additional music (via download or streaming delivery over a wire or wireless network). Conventional brick and mortar retailers can use linking to provide information about the music and to provide buying opportunities. Radio stations and other broadcasters can use the linking capability to bring users to their web sites, creating advertising revenue, to provide electronic buying opportunities for music, concert tickets, clothing items, etc. These and other forms of linked metadata and actions may be implemented in various combinations in different application scenarios.

Depending on the application, the identifier may identify the media object in which it is embedded, or entities, things or actions other than that particular media object. One type of identifier is an object ID that identifies an audio object. This identifier may be a number associated with the object, such as its International Standard Recording Code (ISRC). Another type of identifier is distributor ID that identifies the distributor of the audio object. Another type of identifier is a broadcaster ID that identifiers the broadcaster of the audio object. Of course, more than one identifier may be encoded into an audio object or its container. In the event that an object ID is not encoded with an audio object, but instead, a distributor or broadcaster identifier is encoded with the object, other context information, such as the time of play back or distribution, location of distribution, etc. may be used to identify the audio object as part of the linking process. An example is a radio station that marks its broadcasts with a station ID and maintains a playlist database with the air times of each audio object. At decoding time, the station ID is extracted and used along with context information such as the air time of the audio object to look up the audio object or its corresponding metadata and actions. This approach enables the linking system to provide audio object specific metadata or actions even without requiring a unique object identifier in every audio object.

System Implementation

FIG. 1 is a diagram of a system configuration of linked media objects. In this configuration, an identifier links audio objects to metadata via an electronic network, such as the Internet, a wireless network, or a broadcast network. As depicted in FIG. 1, an embedding process may be used to encode an identifier in an audio object or its container. In some cases, an embedding process encodes the identifier in the audio file (e.g., a tag in a file header or footer), in the audio signal (a digital watermark), or in the physical packaging. The identifier may also be derived as a function of the audio signal or other information in the file or physical packaging (e.g., track information on a CD). In the case of dynamically derived identifiers, an embedding process is not necessary because the identifier can be derived from the content at decoding time.

In some application scenarios, the embedding process interacts with a registration process to get an identifier. The embedding process provides information about the object (e.g., a title and artist name, an ISRC, name of distributor, etc.). In response, the registration process provides an identifier and stores a database record of the association between identifier and the object or other information used in decoding to identify the object, such as its distributor or broadcaster. The registration process may be used to assign an identifier to an audio object and to distributors or broadcasters of audio objects. The embedding and registration processes may occur before the audio object is distributed to consumers, or sometime thereafter, such as when a user transfers (e.g., "rips") a media object from one format to another (e.g., a packaged format to an electronic file format such as a compressed file format).

Once registered, an interactive or automated mapping process associates the identifier with data or actions. The registration process creates a database of identifiers and associates the identifiers with corresponding media objects, distributors, broadcasters, etc. The mapping process associates the identifiers with corresponding metadata or actions.

Once associated with an audio object and metadata, the identifier transforms the audio object into a linked object. The identifier remains with the object through distribution, although some embedding processes are more robust than others to intentional or unintentional distortion/removal of the identifier. There are a variety of different distribution scenarios. Some examples depicted in FIG. 1 include transferring an audio object over a computer network, streaming the object over a computer network, or broadcasting it (e.g., AM/FM broadcasting, digital broadcasting, broadcasting over wireless carriers, etc.). Whatever the distribution process, a user ultimately receives the linked object in a player, tuner, or capture device.

To activate the linked object, a decoding process extracts the identifier and uses it to access associated data or actions. The decoding process may be implemented as a separate program or device, or integrated into a player, tuner, or some other capture device, such as a listening devices that converts ambient audio waves to an electronic signal and then extracts the identifier from the signal.

In the configuration shown in FIG. 1, the decoding process forwards the extracted identifier to a communication application, which in turn, forwards it in a message to a server. The decoding process or the communication application may add additional context information to the message sent to the to a server. The context information may relate to the user, the user's device, the attributes of the session (time of playback, format of playback, type of distribution (e.g., broadcast or transmitted audio file), etc.) Based on identifier and optional context information, the server determines an associated action to perform, such as re-directing an identifier or context data to another server, returning metadata (including programs, content, etc.), downloading content, logging a transaction record. To find the associated action or actions, the server maps the identifier to actions based on the information established in the mapping process. The server may: 1) look up the data and actions in a local database stored in its memory subsystem; 2) route the identifier to one or more other servers via the network, which in turn look up related actions and data associated with the identifier; or 3) perform some combination of actions 1 and 2.

In the first case, server 1 returns data or actions associated with the identifier. The server may look up related data based on the identifier alone, or based on the identifier and other context information. Context information may be information provided by the user, by the user's computer or device, or by some other process or device. In the second case, the server looks up one or more addresses associated with the identifier and forwards the identifier and/or possibly other context data to secondary servers at these addresses via conventional networking protocols. Again, this context data may include data from the user, the user's computer, some other device or database. For example, server 1 might query a remote database for instructions about how to process an identifier. These instructions may specify data to return to the communication application or to forward to another server, which in turn, looks up associated data and returns it to the communication application. A server may return data that an audio player displays to the user or uses to control rendering of the content. For example, the server can tell the player that the object contains inappropriate content for children. The player or user can make decisions about whether or how to play the material based on this information.

Both the server and the player can adopt a set of rules. The server rules may be used to control what the server returns in response to an identifier and context data. The player rules may be used to control what the player displays to the user or how it renders the content based on data returned from a server.

Either the first server, or a server one or more levels of indirection from the identifier may return data and programmatic actions to a player via the communication application. Each server in these levels of indirection receives a database key, such as an identifier or context information, from the previous server, and uses it to look up corresponding actions. These actions may include returning data or programs to the communication application or to previous servers in the routing path of the message from the communication application. Also, the servers may route requests for information or actions to other servers. The server or servers may return data or perform actions in response to the identifier (or other context data) that do not directly impact the decoding process, or the device in which it operates.

The system depicted in FIG. 1 allows several different interested parties to establish services linked via the identifier. For example, server 1 can be configured to provide generic promotional and/or licensing information associated with an identifier. If the content owner, distributor, retailer, artist or other related party wishes to provide information or services for a connected object, then server 1 may also route the identifier for that object, and possibly context information, the address of the communication application, and instructions, to servers maintained by these entities. These servers, in turn, provide promotional, sales, or licensing information, and electronic buying or licensing opportunities specific to that entity back to the consumer over the network via the communication application.

In the context of a network configuration, Internet protocols may be used to return data to the communication application or to the device or system in which it operates. The communication application may be implemented in a web browser, such as Internet Explorer or Netscape Navigator. Examples of ways of exchanging information between a client player and a server include returning a web page with metadata and program scripts designed to run on the end user's system. The metadata itself may include active links, such as URLs to other network resources, such as a web site or some other network service. The path of the identifier from the decoding process, and the return path from a server to the communication application may include one or more hops through a wire or wireless connection using standard wire and wireless communication protocols like TCP/IP, HTTP, XML, WAP, Bluetooth, etc. In addition, data returned to the user may be routed through one or more servers that may forward the data, and in some cases, augment the data or modify it in some fashion.

Figure 2:
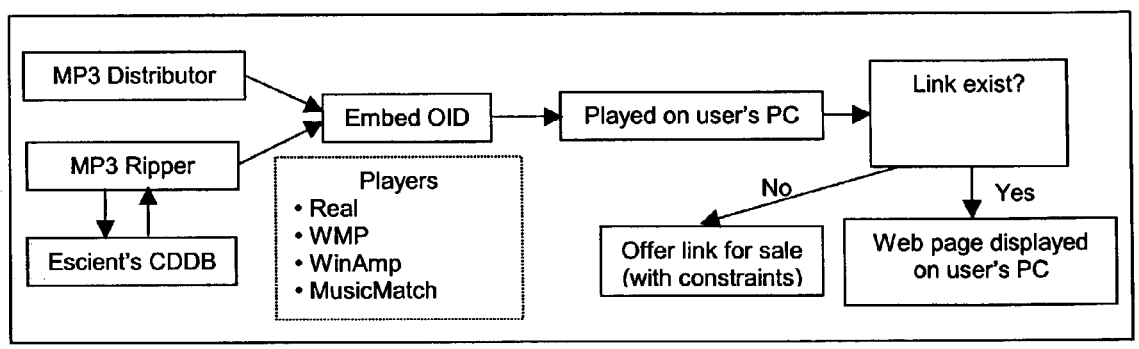
FIG. 2 is a diagram illustrating media object linking applications.

FIG. 2 is a diagram illustrating applications of the system depicted in FIG. 1. In the application scenarios depicted in FIG. 2, an embedding process encodes an object identifier (OID) into an audio file, such as an ID3 tag in the header of an MP3 file or audio frame headers in the MP3 file. FIG. 2 shows two embedding scenarios. The first is an MP3 distributor that embeds OIDs in MP3 files before transmitting them over a network, such as the Internet, typically via a web site interface. The second is a file ripping process where a programmed computer or other device extracts an audio object from packaged media such as a CD and converts it into a coded file format like MP3. In the latter case, the ripping process may extract metadata from the CD, such as the table of contents, and use this metadata as a key to a database (CDDB) to get information about the songs on the CD, such as title, artists, etc. The table of contents or other metadata from a package medium, such as optical or magnetic storage or flash memory, may be hashed into an index to a database entry that stores information about the media signal stored on the medium. The ripping process uses the information returned from the database to identify the audio objects on the packaged media so that they can be associated with an OID. This is an example of identifying information used to associate an OID with an audio object. As part of the coding process, the ripping process inserts the OID in the file header of the MP3 file.

Later, when a user opens or plays the marked MP3 in a player, such as a software player like the real player, Liquid Audio player, Windows Media Player (WMP), WinAmp, MusicMatch, etc., a plug-in software module in the player extracts the OID and forwards it to a server via an Internet connection. The plug-in may establish its own Internet connection, or pass the OID to an Internet Browser, which in turn, establishes a connection (if one is not already present) with the server. As an intermediate step, the plug-in may display a window with user options, such as "learn more about the song", "play the song", or both. The user can then choose to get more information by actuating the first or third options in the user interface window, which cause the plug-in to forward the OID to the server.

The server then returns a web page associated with the OID, or re-directs the OID to another server (e.g., one maintained by the content distributor or owner), which in turn, returns a web page of information about the object and links to related actions (e.g., a link to a licensing server, a link to a server for buying and downloading related music etc.). The licensing server may be programmed to download software players and new music offerings compatible with those players. For instance, the licensing server may provide software for decrypting, decoding, and playing electronically distributed music according to usage rules packaged with the electronically distributed music. In this application scenario, the linking of the MP3 file enables the content owner to market music and products that promote the sale of audio objects in other formats, included formats protected with encryption, watermark copy managements schemes, etc.

In the event that a media object is not linked, the decoding and server processes can be programmed to enable the user to purchase a link for the object. For example in one scenario, the player plug-in displays a graphic for a link information indicating that the link is available after determining that an OID is not in the file. If the user clicks on the graphic, the plug-in displays more information about the procedure for purchasing or renting a link. This information may be provided in conjunction with querying the server and displaying information returned from the server, or alternatively, providing pre-programmed information incorporated into the plug-in. If the user is interested in purchasing the link, he or she can then enter input (e.g., click on a button such as "Get Link") that initiates the process of registering an OID with the object and associating metadata or actions with the OID. The process of registering the OID and associating the OID with metadata or actions may be performed as described in this document. This scenario provides yet another mechanism for transforming content into connected content.

There are many possible variations to the applications scenarios illustrated in FIG. 2. During the file ripping process (or some other embedding process), the embedder may generate a unique ID from the metadata read from the packaged media on which the media object resides. One example of such an ID is the number derived from CD metadata currently used to index information in the CDDB database. This ID may then be embedded in the audio object or its file header/footer. During OID registration, the registration process may inform the embedding process that the OID (and thus, the object for which it was derived) has not been associated with metadata or actions. In this case, the user may be given an opportunity to purchase the link, either at the time of ripping, or in the future, wherever the object travels. In the latter case, the OID in the object is associated with an option to buy the link and customize the data and/or actions associated with that link. Rather than link to promotional information, the OID gives users an option to buy or rent the link and provides them with an opportunity to customize it (e.g., linking it to a custom web site). Once customized, other users that open or play the file will then be able to link to the customized information or actions.

To assert control over the type of customization that users may perform, the registration and mapping processes can place constraints on the types of metadata and actions that users can link to a media object.

In the multimedia content industry, there are typically many rights holders and entities involved in the distribution process. This may present a conflict when linking a media object to one entity. One way to address this problem is have an object link to many different entities. For example, the server could map an OID to many entities and return links to retailers, distributors, record labels and artists. Another way to address it is to encode additional information about the distributor in the OID. For example, the OID includes fields that identify the object and its distributor. If a user activates the link to purchase products, including media objects, then the distributor name is logged with the purchase and that distributor is credited with royalties associated with the transaction. The distributor field may also be used as a key to look up the appropriate action for the OID, such as re-directing the OID to the web server of the entity associated with that OID. In this approach, even if the OID directs a user to a record label's website, the distributor field can be used to credit the distributor with a royalty for the linking transaction.

The entity responsible for maintaining a web site linked via on identifier can make deals with online resources for providing data about a media object such as lyrics, song titles, radio station play lists. The website may link to this information, access it via a database manager, etc.

Still another application is the sale or promotion of music or video over the internet. Taking the case of music, an artist may freely distribute a low-fidelity (or otherwise corrupted or abridged) version of a song. The low fidelity can be by reason of bandwidth limitation (e.g., 500 Hz–2.5 KHz), monophonic (as opposed to stereo), or otherwise. The artist can seek to distribute the low-fidelity version as widely as possible, to serve as a marketing agent for the artist's other works. (The free distribution of lower-bandwidth audio may serve to alleviate some of the network bandwidth problems faced by universities whose students actively engage in transferring free music over the internet.)

Each low-fidelity version can be processed to extract an identifier (e.g., a steganographic in-band watermark; a numeric ID or song/artist name field in a in a file header; a 128-bit hash value obtained by applying a hashing algorithm to the music data, the music file header data, a portion thereof, etc.) If a listener is interested in obtaining a full-fidelity version of the work, the listener can operate a suitably programmed computer or music appliance that extracts the identifier from the work and passes it on to the remote system. The remote system can respond in various ways, e.g., by providing a full-fidelity version of the same work back to the user (such as MP3 download) and charge the user's credit card a fee (e.g., $0.99); or by directing a web browser on the user's computer to an e-commerce/fan web site associated with the music, etc. Such functionality can be provided in general purpose programs such as Microsoft's Internet Explorer, e.g., by right-clicking on a file to obtain a menu that includes this and related functions.

File Identifiers

One form of identifier is an identifier that is inserted in an audio object file, but in a distinct field from the audio signal itself. Some examples are file headers and footers. This file identifier may be assigned before or after distribution of the audio object to consumers. In addition, it may be derived from the audio signal or other information in the file. For example, an identifier generator may derive a unique or sufficiently unique identifier from a portion of a music signal. A variety of methods for generating a unique numbers based on a unique collection of numbers may be used.

The process of embedding a file identifier may be done at the time of encoding or transcoding a file. For example, the file identifier may be inserted during a ripping process, such as when a device or programmatic process converts a song from a format stored on packaged media, like a CD or DVD, to an electronic, and compressed form, such as MP3 or some other audio codec. As another example, the file identifier may be inserted when a device or programmatic process transcodes an electronic music file from one codec format to another. Yet another example is where a file is taken from a digital or analog uncompressed format, and placed in another format for distribution.

Identifiers Embedded In Audio Signal

Another way to associate an identifier with an audio signal is to embed the identifier in the audio signal using steganographic methods, such as digital watermarking or other data hiding techniques. Many of such techniques have been developed and are described in published articles and patents. Watermarking methods are described in U.S. patent application Ser. No. 09/503,881. Other examples of methods for encoding and decoding auxiliary signals into audio signals include U.S. Pat. Nos. 5,862,260, 5,940,135 and 5,945,932. For more information on steganographic applications, see the patent applications incorporated by reference.

The steganographic embedding method may be performed in a batch process. Consider a distributor of electronic music via the Internet or some other network, or a broadcaster of music such as a radio station. In each case, the distributor and broadcaster have a collection of audio objects. The embedding process may operate on this collection of objects in a batch process by retrieving an electronic version, encoding an identifier obtained from the registration process, and returning the marked version for later distribution or broadcasting. In some cases, it is desirable to do watermark embedding in an iterative process in a studio environment to encode the watermark with an intensity that achieves desired perceptibility and robustness requirements.

The steganographic embedding method may also be performed at the time of transmission of an electronic file or broadcast of the audio object. In the case of distribution via a network such as the Internet (e.g., streaming or file download), real time embedding enables the embedding process to also embed context information that is specific to the consumer (or the consumer's computer) that has electronically ordered the object. For example, when the user requests a file in a streaming or a compressed file format via the Internet using her browser, the distributor's server can request information (perhaps voluntary) about the user to be associated with the transmitted object. Later, the decoding process or the servers that map the identifier to actions or metadata can use this information to determine the types of information to provide or responsive action to perform.

In the case of broadcasting, real time embedding enables the identifier to be steganographically embedded throughout an electronic version of the audio signal just before, or as part of the broadcasting process.

An object or distributor ID (as well as other identifiers or context information) can be embedded in the payload of a watermark that is also used for copy control. Portion of the watermark can be used to control whether the object can be played, transferred, recorded, etc., while another part can be used to carry identifiers and other metadata for linking functions described in this document. Alternatively, entirely separate watermark encoding and decoding methods may be used for copy control and linking functions.

A watermarking process may be used to encode different watermarks in the various channels of an audio signal. Message information may be embedded in one or more channels, while synchronization or orientation signals used to detect and decode the message information may be encoded in other channels. Also, different messages (e.g., different identifiers) may be encoded in different channels. At decoding time, the different identifiers can trigger different actions or link to different data.

In broadcasting applications, an identifier may be encoded along with the broadcast of the associated media signal by modulating a subcarrier of the main carrier frequency used to transmit the media signal. The subcarrier conveys auxiliary data such as the identifier, while the main carrier conveys the associated media signal. To reduce audibility of the auxiliary data (e.g., the identifier(s)) encoded in the sub-carrier, the data can be randomized by applying it to a pseudorandom or random number by some function that may be inverted in the decoding process, e.g., multiplication or exclusive OR functions. One example of sub-carrier encoding and decoding is Active HSDS 97 developed by Seiko Corporation.

Identifiers In Digital Radio Broadcasts

Some forms of digital radio broadcasts support transmission of metadata along with media signals. This metadata can also be used to carry one or more identifiers that are mapped to metadata or actions. The metadata can be encoded at the time of broadcast or prior to broadcasting. Decoding of the identifier may be performed at the digital receiver. In particular, the digital receiver receives the broadcast data, extracts the identifier, and either automatically, or at the user's direction, forwards the identifier to a server to look up the associated metadata or action.

Dynamic Identifier Extraction from Audio Content or Related Data

As noted above, another way to associate an identifier with a corresponding audio signal is to derive the identifier from the signal. This approach has the advantage that the embedding process is unnecessary. Instead, the decoding process can generate the identifier from the audio object. In this case, the decoder computes a fingerprint of the audio signal based on a specified fingerprinting algorithm. The fingerprint is a number derived from a digital audio signal that serves as a statistically unique identifier of that signal, meaning that there is a high probability that the fingerprint was derived from the audio signal in question. One component of fingerprint algorithm is a hash algorithm. The hash algorithm may be applied to a selected portion of a music file (e.g., the first 10 seconds) to create a fingerprint. It may be applied to discrete samples in this portion, or to attributes that are less sensitive to typical audio processing. Examples of less sensitive attributes include most significant bits of audio samples or a low pass filtered version of the portion. Examples of hashing algorithms include MD5, MD2, SHA, and SHA1.

As an aside, fingerprinting may also be used to determine whether an audio signal has been watermarked. The fingerprinting application can evaluate a fingerprint for a received object and compare it with one for a watermarked object (or unmarked object) to determine whether the object is likely to be watermarked. Certain fingerprints can be associated with certain types of watermark methods. Using the fingerprint, a decoding device can select an appropriate watermark decoding system for the object.

While specifically discussed in the context of audio objects, the fingerprinting process applies to other types of multimedia content as well, including still images, video, graphics models, etc. For still images and video, the identifier can be derived dynamically from a compressed or uncompressed version of the image or video signal. The fingerprinting process may be tuned to generate a specific identifier based on the type of file format. For example, the process extracts the file format from the file (e.g., from a header or footer), then uses a fingerprinting process tailored for that type of file (e.g., a hash of a compressed image or video frame). The dynamic identifier computed by this process may be associated with metadata and/or actions using the processes and systems described in this document.

Registration Process

One way to implement the registration process is to build client and server application programs that communicate over a computer network using standard network communication protocols. The client may be implemented as a software program that provides identifying information about an audio object. It can obtain the information by prompting the user for the identifying information, or from extracting it from the audio object or its container. The server may be implemented as a database management program that manages identifiers and corresponding audio objects. When queried to provide an identifier for particular identifying information, the program checks whether it has already assigned an identifier to an object based on the identifying information. If so, it returns that identifier that has already been assigned. If not, it assigns a new identifier number, creates a new entry in the database for that number and its associated identifying information.

The type of identifier used to link audio objects varies with the application. As such, the registration process may vary as well. One type of identifier is a unique identifier for an audio object. Another type of identifier is one that identifies some attribute of the audio object, but does not uniquely identify it, such as a distributor or broadcaster identifier. This type of identifier requires additional context information to uniquely identify the audio object at the time of linking it to actions or metadata. For these types of identifiers, the registration process provides information identifying the attribute of the audio object, such as its distributor or broadcaster. In response, the server provides an identifier that may be embedded in several audio objects that share that attribute.

One example is a broadcaster ID, such as a radio station ID. Audio broadcast by the radio station is embedded with this radio station ID. To identify the object, context information such as the play time captured at the tuner is used along with the radio station ID extracted from the received audio signal to identify the audio object. The decoding process forwards this information to a server. Using the radio station ID and context information, the server maps the ID to an appropriate action. This may include querying a radio station's playlist database for an object identifier based on the station ID and context information. The server can then map the object identifier to an action or metadata based on the object ID returned from the playlist database. Other scenarios are possible. For example, the server could forward the station ID, context data and decoder address to a radio station server, which in turn, looks up the appropriate action or metadata (e.g., web page) and sends it to the device that decoded the station ID.

Broadcast content can also be associated with object identifiers. One way to implement the identifier assignment process is to allocate a unique set of identifiers with each broadcaster/distributor. Those broadcasters or distributors are then free to assign the identifiers to media objects as they wish. Once they complete the identifier assignment process, they may then associate the identifiers with the metadata or actions in a mapping process.

Embedding Process

The embedding process may be integrated into a software program along with the client of the registration process described in the previous section. This integration of registration and embedding functions is particularly suited to a batch embedder, where processing time required to request an identifier is less of a concern.

In real time embedding, the identifier or identifiers are preferably available for associated audio objects before embedding begins. For example, the identifiers can be maintained in a local database on the embedding computer or device and indexed by object title. Distributor and broadcast identifiers are more straightforward because they may be applied to several different audio objects.

The embedding process may also be implemented in an embedding clearinghouse system. The embedding clearinghouse is a computer or other electronic system that analyzes media objects and embeds one or more links in the media objects. The clearinghouse may be implemented in a server on a network, such as the Internet and operate on content in a "push," "pull," or some combination of push and pull models. In the push model, users and other systems send media objects to the embedding clearinghouse for analysis and embedding. The pull model, the clearinghouse has the capability to search for and gather media objects for embedding and analysis. One example of this pull model is an Internet search process called a spider that crawls the Internet, searching for media objects to analyze and embed with one or more identifying links.

The embedding clearinghouse analyzes a media object (perhaps based on out of band data like a file header or footer) and inserts an identifier. This identifier may link to a metadata and actions, such as re-direction to a web site offering products, services, and information related to the content. The embedding clearinghouse may incorporate search engine technology to execute a key word search based on information from the media object and then associate the media object with a series of related URLs returned from the Internet search. The process may be automatic, or with some user input to select which sub-set of links should be inserted.

The embedding clearinghouse may also offer an identifier embedding services for those wanting to link their media objects with metadata, actions, etc. In this application scenario, the embedding clearinghouse may be implemented as an Internet server that is accessible via a web page using conventional network communication and web protocols. To access the server, users visit a web page using an Internet browser. In exchange for a fee, which may be tendered electronically over the Internet from the user's computer to the server, the server provides an embedding service to embed an identifier into a media object uploaded from the user via the user's computer and Internet connection. The user can select the information to associate with a media object, such as generic identifying information (e.g., title, author, owner), generic licensing information, or special information or actions. The provider of the embedding clearinghouse server hosts the generic information, while the special purpose information and actions are accessed through re-direction. In particular, the provider of the clearinghouse server links the embedded identifier to an address or set of addresses of servers that provide the special information or actions. Then at decoding time, the decoding process sends the identifier to the provider's server, which in turn, redirects the identifier to a secondary server or servers that provide special purpose information or actions (e.g., redirect to a web page of the content owner, download related content, provide electronic licensing services, etc.).

Decoding the ID and Embedded Context Data

The implementation details of the decoding process depend on how the identifier is encoded into an audio object or its container. In the case where the identifier is encoded in a file header or footer, the decoder may be a software program or digital hardware that parses the header/footer and forwards it to the communication application. One way to implement this type of decoder is to integrate it into a media player as a plug in program. Examples of media players include Windows Media Player from Microsoft, Liquid Audio player from Liquid Audio, Winamp, Real Player from Real Networks. Preferably, the plug-in gives the user visual feedback that the identifier has been detected and displays a window with options to access more information or actions available via the link. For example, the user can be presented with a user interfaces prompting the user to click for more information or buying opportunities. If the user selects these options, the plug-in forwards the user selections and identifier to the communication application, which forwards them to the server (e.g., server 1, FIG. 1).

In the case where the identifier is steganographically encoded in the audio object, a corresponding decoder extracts the identifier. This type of decoder may be implemented as a plug in to a software player as described in the previous paragraph. It may also be implemented in a tuner for broadcast content, or in a listening device that captures audio from the ambient environment.

In the case where the identifier is derived from the content or container metadata, the decoder captures the pertinent portion of the audio object, and generates the identifier as described above. This type of decoder can be implemented in a software or hardware player, a tuner, etc.

The decoder may collect identifiers in response to a user request while objects containing these identifiers are being played. For example, when the user is playing music, he may like a song and want to buy it or get more information. This feature may be implemented by building an interface that has a button or voice recognition that enables the user to request information or a buy/license opportunity. Once captured, identifiers can be forwarded along with user instructions to the appropriate server.

However, one particularly useful feature is to enable the user to fetch information and make orders from music as the music is playing. The system described previously supports this feature because the decoding process can forward the identifier or identifiers, embedded context information, or additional context information (user information, play time, broadcast type, file type, player type, operating system type) to the communication application as the music is playing. The user can trigger the linking action by pressing a "fetch" button, or saying fetch to a voice activated input device that causes the decoding device to package a message and invoke the communication application (e.g., Internet browser). In turn, the communication application forwards the message to a server that parses the message and determines the associated action.

The activation of the "fetch it" feature may be made on a handheld device that communicates with a decoding device in a tuner via a wireless connection. For example, a user may press a button on a remote control device, like a key chain, which sends a wireless signal to a receiver in the tuner. The receiver invokes the decoding process. The tuner may also send metadata from the server to the remote control device for display using a similar wireless connection. Infrared or RF transceivers, for example, may be used to communicate the data back and forth.

The decoding device may also provide continuous decoding of identifiers. When the user requests a "fetch," the identifier and context information for the current song may be forwarded to the server. Also, the decoding device may automatically fetch generic information such as song title and artist so that this information is immediately available to the user.

Another possible implementation is to temporarily buffer identifiers extracted from some predetermined number of the most recent songs, titles, etc. These identifiers can be stored along with other metadata, such as a time stamp, to inform the user when they were captured. The user can then select one or more of the items to send to the server for more information or related actions.

These features may be implemented in one or more devices. While the example above discusses a remote control device and a separate tuner with a decoder, these functions may be integrated into a single device, such as a car stereo, phone handset, personal digital assistant, and a variety of other types of players or tuners.

The identifier enables dynamic linking. Dynamic linking enables the identifier encoded with a media object to remain fixed, while the metadata or actions associated with that identifier can be changed. To change the associated metadata, the mapping process edits the identifier database to associate new metadata or actions with an identifier. The mapping process can be automated to change metadata or actions associated with an identifier at periodic intervals or in response to system events. In addition, a user may change the associated metadata or actions interactively at any time. To facilitate access to the database, a web-based interface can be added to the database.

Dynamically linked data returned from a server to a player environment can be displayed to the user in a variety of ways. One way is to display it in a web page or user interface window of a player. The data can be animated by scrolling it across the visual display. The data can also be displayed in the form of HTML links, which, when activated, cause the download of other data or initiate actions, such as playing streaming content from a server.

Server Types

As discussed elsewhere, the servers used to link identifiers to actions may be programmed to provide a variety of actions including:

returning data and HTML links (e.g., in the form of an HTML document, scripts, etc.)
downloading media signals in streaming or file format
performing an electronic transaction (selling products like CDs, DVDs, concert tickets, etc. via computer transaction using credit cards, digital money, etc.)
establishing a license to use a linked media object
re-directing to another server
performing database look up operations for related information, links, actions
performing database look up to uniquely identify a media object based on distributor/broadcaster ID and other context information
creating a transaction log This is by no means in exhaustive list. Another type of server action is to initiate a process of searching a database, a collection of databases or the Internet for additional information related to a linked media object. This type of search service may be performed continuously and the results associated with the identifier. Then, in response to a request from a decoding process, the server can return a digest of the results with links to web pages for additional information.

Communication Application

The implementation details of the communication application are highly dependent on the type of communication link and protocols used to connect the decoding process to a server. Above, an Internet browser is provided as an example. A browser may be implemented in conventional PCs, handheld devices, wireless phones, stereo systems, set top boxes, etc. However, the communication application need not be based on computer network protocols. For wireless devices, where the marked content is played on wireless carrier frequencies, the communication application can employ wireless communication technology to forward identifiers and context information to servers that map this information to actions or metadata and return it via a wireless carrier frequency to user's handset.

Tracking Transactions and Report Generation

As depicted in FIG. 1 and described above, the servers for mapping identifiers to actions may be programmed to dispense a transaction log into a log file. A report generation process can then enable users to define and request queries of data from the log file based on a particular identifier, a particular type of context information (time frame, geographic location, user demographics, etc.), a particular action, etc.

Capture Devices

As noted above, the decoding process may be implemented in a variety of devices or software that process media objects. These devices and software include programmable devices such as personal computers, personal digital assistants, telephone handsets, set-top boxes, personal stereos, hi-fi components, tuners, receivers, televisions, etc. as well as hardwired devices that may be incorporated into these systems and devices.

In some contexts, it is useful to implement a recording function. This is particularly true in devices that receive a broadcast or stream of media content and need to capture at least a portion of it to decode an identifier. Examples of these devices are radio receivers, and wireless telephone handsets. The record function may be automatic or user activated. In the latter case, the user actuates an input device to control the record process and optionally the record duration. For example, the user may hear a song that she likes and press record. The device, in turn, records at least a part of the object that is currently being received (an audio, visual or audio visual signal). The user can then decide contemporaneously or at a later time to execute the identifier decoding process on the recorded signal. The recording function can be designed to execute for a predetermined or user specified duration.

In the case of radio and television tuners/receivers, the record function can be used to capture a media signal as it is received. In the case of a telephone handset, the record function can be used for a variety of functions, such as recording part of a telephone conversation, recording speech or other ambient audio through a microphone, or recording a media signal received by the handset via a wireless communication channel. The recordings can be compressed and stored in local memory on the device. In addition, they may be annotated with metadata about the media signal, such as a time stamp to show time of capture, a location stamp to show location of capture, metadata extracted from the object (in band or out of band data), etc. A global positioning device may provide the location stamp. Some wireless phone systems are capable of computing location of a telephone handset via triangulation. This location data may be used to provide geographic location coordinates or the name of nearby landmark, city name, etc.

The metadata may be displayed on a display device to help the user remember the context of a particular recording.

In addition, it may be provided as context information along with an identifier to a server that links the identifier and context information to metadata or actions.

Transmarking

In some applications, it may be useful to convert auxiliary information embedded in a media signal from one format to another. This converting process is referred to as transmarking. Transmarking may include converting an out of band identifier like a tag in a header/footer to a watermark or vice versa. It may also involve converting a message in one watermark format to another. The process involves a decoding operating on an input media object, and an encoding of the decoded information into the media object. It may also involve a process for removing the mark originally in the input object to avoid interference with the newly inserted mark.

There are a variety of reasons to perform transmarking. One is to make the embedded information more robust to the types of processing that the media object is likely to encounter, such as converting from one watermark used in packaged media to another watermark used in compressed, and electronically distributed media, or a watermark used in radio or wireless phone broadcast transmission applications.

This type of transmarking process may be performed at various stages of a media object's distribution path. As suggest previously, an identifier in a watermark or file header/footer may be encoded at the time of packaging the content for distribution, either in an electronic distribution format or a physical packaged medium, such as an optical disk or magnetic memory device. At some point, the media signal may be converted from one format to another. This format conversion stage is an opportunity to perform transmarking that is tailored for the new format in terms of robustness and perceptibility concerns. The new format may be a broadcast format such as digital radio broadcast, or AM or FM radio broadcast. In this case, the identifier may be transmarked into a watermark or other metadata format that is robust for broadcast applications. The new format may be a compressed file format (e.g., ripping from an optical disk to an MP3 format). In this case, the identifier may be transmarked into a file header/footer or watermark format that is robust and compatible with the compressed file format.

The transmarking process may leave an existing embedded identifier in tact and layer an additional identifier into the media object. This may include encoding a new watermark that does not interfere with an existing watermark (e.g., insert the new watermark in unmarked portions of the media object or in a non-interfering transform domain). It may also include adding additional or new identifier tags to headers or footers in the file format.

Amplifying an Embedded Identifier

Rather than converting embedded data to another format, an amplifying process may be used to renew an identifier that has become weakened or separated due to processing of the media object in which it is embedded. In this case, a decoder and encoder pair may be used to determine the current identifier and re-encode it. Of course, the encoder can also choose to embed a new or additional identifiers as well.

If the previous identifier is lost, the encoder can query an identifier database established in the registration process, passing identifying information about the media object. The database uses the identifying information to find an associated identifier and returns it to the encoder for embedding in the media object.

Managing On-Line Media Library Through Links in Media Signals

The forms in which digital media content can be distributed continue to evolve rapidly. Video and audio signals can be stored in a digital content package and distributed in physical form, such as an optical or magnetic storage medium, or in an electronic form (e.g., transferred over a network in a compressed or uncompressed form). In this document, a content package refers to a format in which a title, e.g., a film, song, musical album, multimedia collection etc., is played from a complete representation of that title.

In contrast, media content may also be delivered over a wire or wireless communication link in a streaming format. Obviating the need to have a complete copy of the title, a streaming format enables the receiver to play the title as it receives portions of it in a data "stream" from an external source. The following sections describe applications for linking media signals to other content and data using metadata and/or steganography.

Linking Packaged Digital Media to On-Line Library of Media Titles

In this application, a local application (e.g., a device or software process) extracts an identifier from a media signal stored in a content package, and communicates the identifier to a database application to create and manage a library of media titles. Examples of a content package include optical media such as CDs and DVDs, magnetic media such as floppy disks and tapes, flash memory, compressed media files, etc. The user places the package into a media reader, such as a disk drive, player, etc. Operating in conjunction with the media reader, the local application extracts information (e.g., a portion of the media signal) from the package, extracts the identifier, and sends it to a database system (e.g., a server on the Internet). In response, the database system determines the corresponding title and adds the title to an on-line library (e.g., external storage accessible via the Internet). The library may be set up as a personal collection, or a collection for a group of users.

To identify the user(s)' library, the local application provides a user identifier. This user identifier may be authentication information entered by a user (such as a user name and password), or alternatively, may be an identifier (such a device ID) sent automatically by the local application.

The title (i.e. content) is added to the on-line library, by transferring a copy of the selection (e.g., music track, video, etc.) from a master database (e.g., a library of MP3 files, or some other streaming or downloadable content format) to the user's on-line library collection. This arrangement avoids the need to upload content from the user's application. Also, it is a much more secure approach than techniques that simply read title data from a CD and relay same to the on-line library. (It is a simple task for an unscrupulous user to fake the presence of a CD by determining how the client CD software specifies the title to the on-line library, and then mimic same even without possession of a bona fide CD.) The in-band encoding presented by watermarks offers innately better security, and provides opportunities for enhanced security by encryption, etc.

In other arrangements, a copy of the selection, per se, is not transferred from the master database to the user's library, but rather a reference (e.g., a link or pointer) to the master library is added to the user's library. Efficiencies in storage can thereby be achieved (i.e., a copy of each selection is stored only once, from which an unlimited number of users' on-line libraries can link to it).

The identifier may be placed in the content package by steganographically encoding it in the media signal. For example, the identifier may be a reference number (e.g., of 24-256 bits) or the text name of the title embedded in a digital watermark. In a digital watermark implementation, a watermark embedder encodes the identifier in video, audio and/or images. The local application includes a watermark detector that reads at least a portion of the media signal from the package, detects the watermark, and reads the identifier embedded in the watermark. The detector may be implemented in a computer program (e.g., driver application, browser plug-in, etc.). A communication application, such as an Internet browser, then communicates the identifier to the database system, which may be implemented using conventional database management and Internet server software.

One advantage of this application is that it allows a user to create an on-line library of titles, and then playback those titles from the library on demand. For example, the user may organize a large collection of titles, view titles in a variety of formats, and playback individual songs or videos, in any order and at any time. The user can request playback anywhere by connecting to the on-line database and requesting a streaming delivery or file down load.

For playback, a player application (e.g., device or application program on a computer) sends a request to a content delivery system via a wire or wireless connection. The content delivery system first checks to make sure that the user has the title in her online library. In addition, it may authenticate the user and determine usage rights before returning any content. If it determines playback to be authorized, the content delivery system sends the titles by streaming the content to the player application, on demand, in the order requested.

Linking Streaming Media to On-Line Library of Media Titles

A similar scheme to the one described in the previous section may be implemented for streaming media. In this case, the local application need not have a packaged version of the content to add a title to a user's library. Instead, the local application extracts an identifier from a portion of the streaming content. The identifier may be embedded in a watermark that is replicated throughout the media signal. In the event that the portion of the streaming media does not contain an identifier, the local application continues to execute a detection process on the media signal as it arrives until it has extracted the identifier.

In either of the above applications, the user can initiate a process of extracting the watermark by an explicit request, such as by clicking on the visual UI of the local application, entering a voice command, etc. Alternatively, the local application may initiate the detection process automatically whenever the user starts playback from packaged or streaming content.

The identifier may also include usage rights that dictate how the user (as identified by a user ID) may retrieve a copy from the library for playback. For example, the watermark may include a number that represents the number of times the user can access the content for playback.

Linking Packaged or Streaming Media to Database of Auxiliary Information Related to the Media In addition to linking to a title database, the identifier may also link to other information or machine instructions relating to the media. For example, the database may send a set of options back to the user (e.g., in the form of a HTML page) that allow the user to select and download additional information related to the media signal in which the identifier is embedded.

Operating Environment for Computer Implementations

Figure 3:
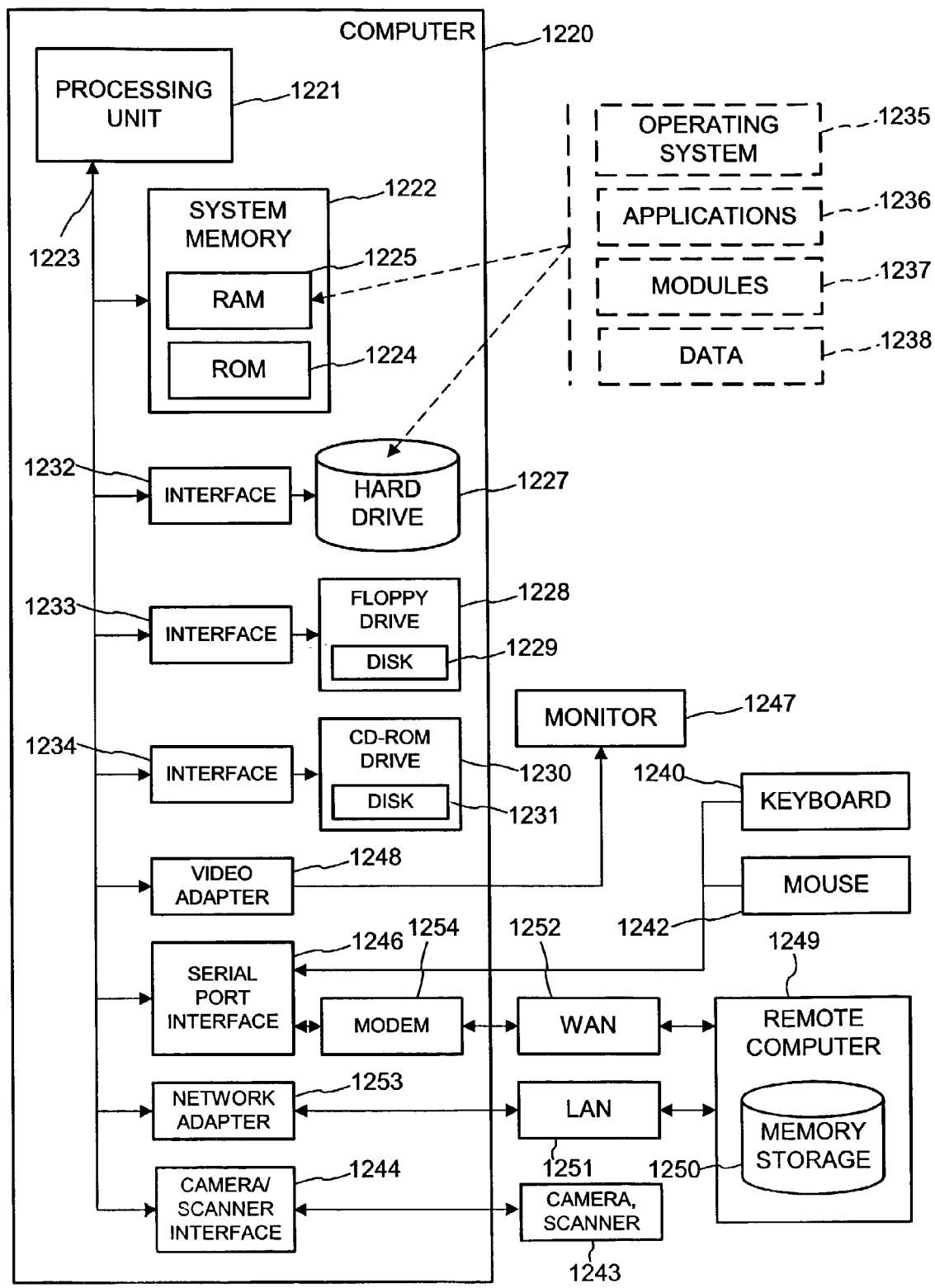
FIG. 3 is a diagram illustrating an operating environment for multimedia content management and delivery applications.

FIG. 3 illustrates an example of a computer system that serves as an operating environment for software implementations of the systems described above. The software applications may be implemented in C/C++ and are portable to many different computer systems. FIG. 3 generally depicts one such system.

The computer system shown in FIG. 3 includes a computer 1220, including a processing unit 1221, a system memory 1222, and a system bus 1223 that interconnects various system components including the system memory to the processing unit 1221.

The system bus may comprise any of several types of bus structures including a memory bus or memory controller, a peripheral bus, and a local bus using a bus architecture such as PCI, ISA and EISA, to name a few.

The system memory includes read only memory (ROM) 1224 and random access memory (RAM) 1225. A basic input/output system 1226 (BIOS), containing the basic routines that help to transfer information between elements within the computer 1220, such as during start-up, is stored in ROM 1224.

The computer 1220 further includes a hard disk drive 1227, a magnetic disk drive 1228, e.g., to read from or write to a removable disk 1229, and an optical disk drive 1230, e.g., for reading a CD-ROM or DVD disk 1231 or to read from or write to other optical media. The hard disk drive 1227, magnetic disk drive 1228, and optical disk drive 1230 are connected to the system bus 1223 by a hard disk drive interface 1232, a magnetic disk drive interface 1233, and an optical drive interface 1234, respectively. The drives and their associated computer-readable media provide nonvolatile storage of data, data structures, computer-executable instructions (program code such as dynamic link libraries, and executable files), etc. for the computer 1220.

Although the description of computer-readable media above refers to a hard disk, a removable magnetic disk and an optical disk, it can also include other types of media that are readable by a computer, such as magnetic cassettes, flash memory cards, digital video disks, and the like.

A number of program modules may be stored in the drives and RAM 1225, including an operating system 1235, one or more application programs 1236, other program modules 1237, and program data 1238.

A user may enter commands and information into the personal computer 1220 through a keyboard 1240 and pointing device, such as a mouse 1242. Other input devices may include a microphone, joystick, game pad, satellite dish, digital camera, scanner, or the like. The microphone may be used to capture audio signals. Similarly, a digital camera or scanner 43 may be used to capture video and images. The camera and scanner are each connected to the computer via a standard interface 44. Currently, there are digital cameras designed to interface with a Universal Serial Bus (USB), Peripheral Component Interconnect (PCI), and parallel port interface. Two emerging standard peripheral interfaces for cameras include USB2 and 1394 (also known as firewire and iLink).

These and other input devices are often connected to the processing unit 1221 through a serial port interface 1246 that is coupled to the system bus, but may be connected by other interfaces, such as a parallel port, game port or a universal serial bus (USB).

A monitor 1247 or other type of display device is also connected to the system bus 1223 via an interface, such as a video adapter 1248. In addition to the monitor, personal computers typically include other peripheral output devices (not shown), such as speakers and printers.

The computer 1220 operates in a networked environment using logical connections to one or more remote computers, such as a remote computer 1249. The remote computer 1249 may be a server, a router, a peer device or other common network node, and typically includes many or all of the elements described relative to the computer 1220, although only a memory storage device 1250 has been illustrated in FIG. 3. The logical connections depicted in FIG. 3 include a local area network (LAN) 1251 and a wide area network (WAN) 1252. Such networking environments are commonplace in offices, enterprise-wide computer networks, intranets and the Internet.

When used in a LAN networking environment, the computer 1220 is connected to the local network 1251 through a network interface or adapter 1253. When used in a WAN networking environment, the personal computer 1220 typically includes a modem 1254 or other means for establishing communications over the wide area network 1252, such as the Internet. The modem 1254, which may be internal or external, is connected to the system bus 1223 via the serial port interface 1246.

In a networked environment, program modules depicted relative to the personal computer 1220, or portions of them, may be stored in the remote memory storage device. The processes detailed above can be implemented in a distributed fashion, and as parallel processes. It will be appreciated that the network connections shown are exemplary and that other means of establishing a communications link between the computers may be used.

The computer may establish a wireless connection with external devices through a variety of peripherals such as a cellular modem, radio transceiver, infrared transceiver, etc.

While a computer system is offered as example operating environment, the applications may be implemented in a variety of devices and systems, including servers, workstations, hand-held devices (e.g., hand held audio or video players, Personal Digital Assistants such as Palm Pilot, etc.), network appliances, distributed network systems, etc.

Portable consumer electronic devices featuring image- or audio-capture capabilities, such as cell phones, wristwatches, digital cameras, personal digital assistants, and MP3 players, are becoming increasingly prevalent. Watermark information embedded in the captured content can be used to trigger distribution of corresponding content (web pages, high fidelity audio, etc.) from on-line repositories. Thus, for example, music "heard" by a user's cell phone microphone can be processed and used to trigger the electronic delivery of a high fidelity version of the same (or different) music to the user's home computer.

Figure 4:
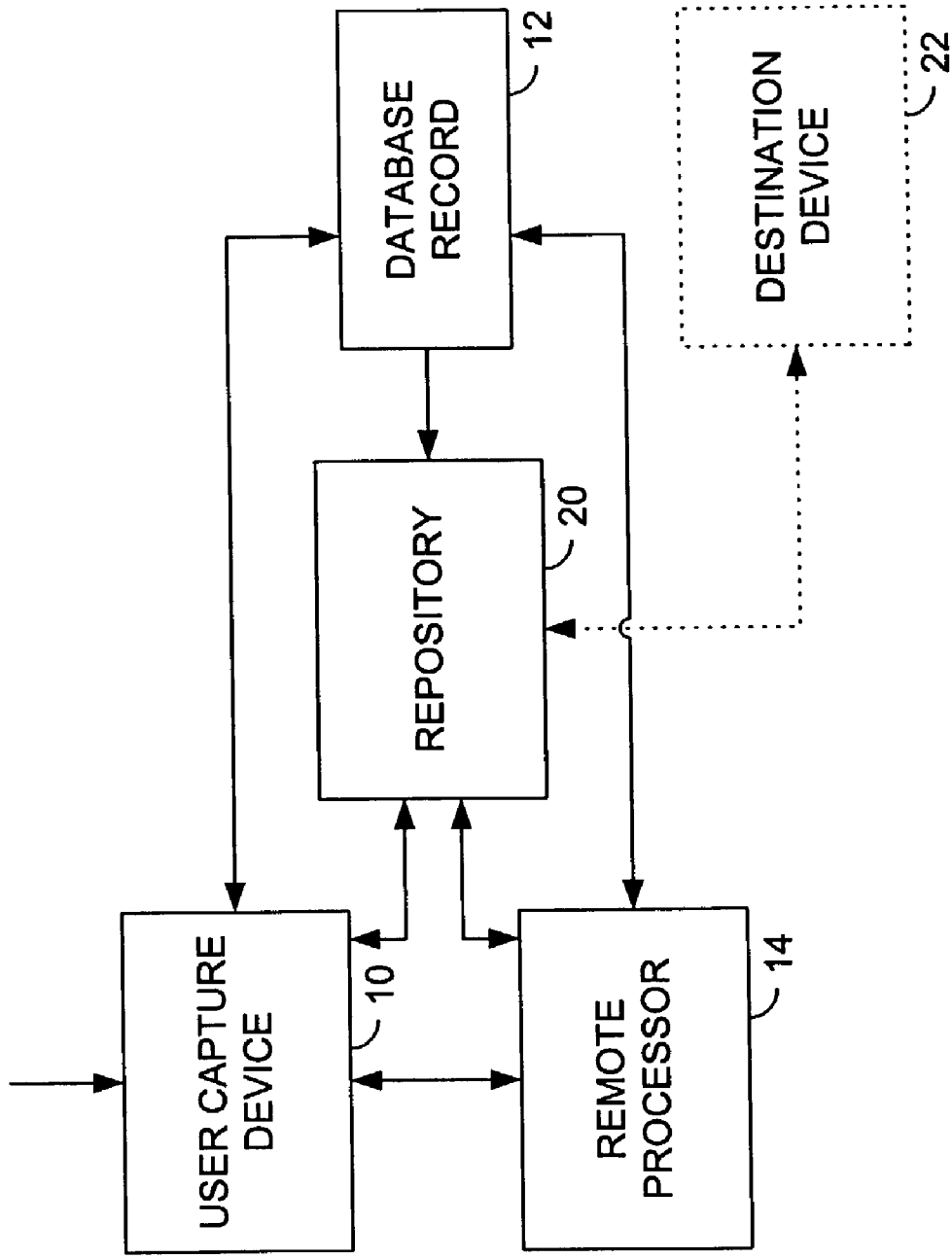
FIG. 4 is a general block diagram that illustrates various embodiments

In accordance with one embodiment (FIG. 4), a camera-equipped cell phone (e.g., as announced by Sanyo/PacketVideo), a personal digital assistant (e.g., Palm Pilot), a wrist camera watch (e.g., the Casio WQV1-1CR), a digital camera, or another portable device 10 with imaging capability, captures one or more frames of image data. (Image data is used to illustrate the same technology. The same principles are equally applicable with sound data. In such case the user device 10 can be a cell phone, an MP3 player/recorder, or other device with audio capture capability.)

In response to a user command (e.g., a dedicated physical or virtual (UI-implemented) button, or a series of keystrokes, etc.), or autonomously (e.g., whenever an image is captured), the device 10 transmits the image data to a remote processor 14. (The remote processor may be the user's home computer, or a server computer serving many users, or another remote computer, etc. The transmission may be by wireless or by a wired connection. The transmission can occur immediately, or the data can be stored in a memory in the device 10 and relayed at a later time, e.g., when network connectivity is established.)

The remote processor 14 performs a watermark decoding operation on the received image data, and extracts a watermark payload. Address information associated with this payload (e.g., a URL stored in a database record 12 indexed by an ID part of the payload, or a URL directly represented in the payload) is then obtained, and used to access an on-line resource 20 (e.g., a web page or music server) that provides content back to a desired destination device for storage or rendering. The destination device can be an output device associated with the user (e.g., a display screen or an audio transducer, either integrated with the image capture device 10, or separate). Or it can be a home media appliance, permitting the user to view or listen to the content upon returning home.

In some embodiments, the address information is forwarded back to a user device (e.g., device 10). The user device then links to the specified resource 20 to acquire the content (so-called "pull" delivery). In other embodiments, the content available at the specified resource 20 is transmitted, at the instigation of the remote device 14, to the destination device (i.e., pushed, rather than pulled).

In other embodiments, the watermark decoding is performed by a processor co-located with the user device 10, e.g., integrated therein.

In still other embodiments, the watermark decoding is performed locally, but the user device is unsuited for receiving or rendering the content provided from resource 20 (e.g., the device's rendering capabilities are limited, or the device's link to the network is of unsuitably low bandwidth). In such case, the device 10 sends an ID decoded from the captured image (or sound) to a media server (e.g., the repository 20, together with instructions indicating what is to be done with content corresponding to the decoded ID). The server may have a higher bandwidth connection with the ultimate destination, or may have more capability to process, render, or transmit the content, than the user device. The server sends a higher fidelity version of the content (or some content related to the captured content) to the ultimate destination 22. (Or the server performs some other processing for which the portable device, or its lower bandwidth connection, are unsuited.)

In the example just given, it will be recognized that the watermark payload transmitted from the user device serves as a proxy for the delivered content. Further details and variants of systems employing such proxy principles described elsewhere in this document In other embodiments, the user's capture device may determine the available external bandwidth and then send the watermark data (rather than the captured content) only where bandwidth is insufficient (e.g., compared to a preset, or user-specified threshold) to transfer content from device 10 to a desired destination. Or this choice of sending the captured content, or the watermark proxy, can be specified by the user. If a first delivery approach fails (e.g., as indicated by an error message returned to one of the devices involved), then another delivery approach can be employed. For example, if a watermark proxy is first sent, but the content respository 20 identified thereby does not have corresponding content, or is otherwise unable to transmit content to a destination device, the user device can be so-informed and, in response, send the content it earlier captured.

The destination device 22 can also exercise some control in the method. For example, it might specify that it wants to receive a high resolution version of the content or a low resolution version of the content. Or, it may simply receive and store the watermark payload or a computer address corresponding thereto (e.g., as determined by the database record 12), permitting it to summon the content as desired, without dedicating local resources to store the content itself.

While the destination device 22 may be a device distinct from the user device, this need not be the case. The user device 10 may both serve as the content capturing node and the destination device. For example, an audio appliance (e.g., an MP3 player/recorder) may capture a part of a watermarked song broadcast over the radio, and thereby obtain a high fidelity version of the same song from an on-line music repository. Again, the appliance can signal the desired content either by locally decoding the watermark, and transferring same to a remote device. Or the appliance can transfer the captured audio itself and allow a remote device to perform the watermark decoding. In any event, and possibly through one or more intermediary devices and databases, the corresponding high fidelity MP3 version is returned for storage on the consumer device. (In some methods, only the decoded watermark data is returned to the user device, permitting it to thereby summon the corresponding content on-demand from a repository 20 without dedicating local resources for storage.)

Further information on systems in which machine-readable indicia (e.g., watermarks) are sensed by a consumer device, and used to link to associated internet content, is found in application Ser. No. 09/571,422. That application, and its priority application 60/163,332, include information on cell phones and the like for use in such applications.

application Ser. No. 09/636,102 details other arrangements in which content captured by one device is provided to a second device for watermark decoding.

application Ser. No. 09/503,881 details illustrative watermark encoding and decoding methods. There are a great number of watermarking techniques known to those skilled in the art that can alternatively be employed.

The embodiments detailed above, and in the cited applications, are illustrative only. A much larger class of embodiments are contemplated within the scope of the present invention—with elements from the detailed embodiments and the incorporated applications interchanged, substituted and combined to yield other embodiments.

Figure 5:
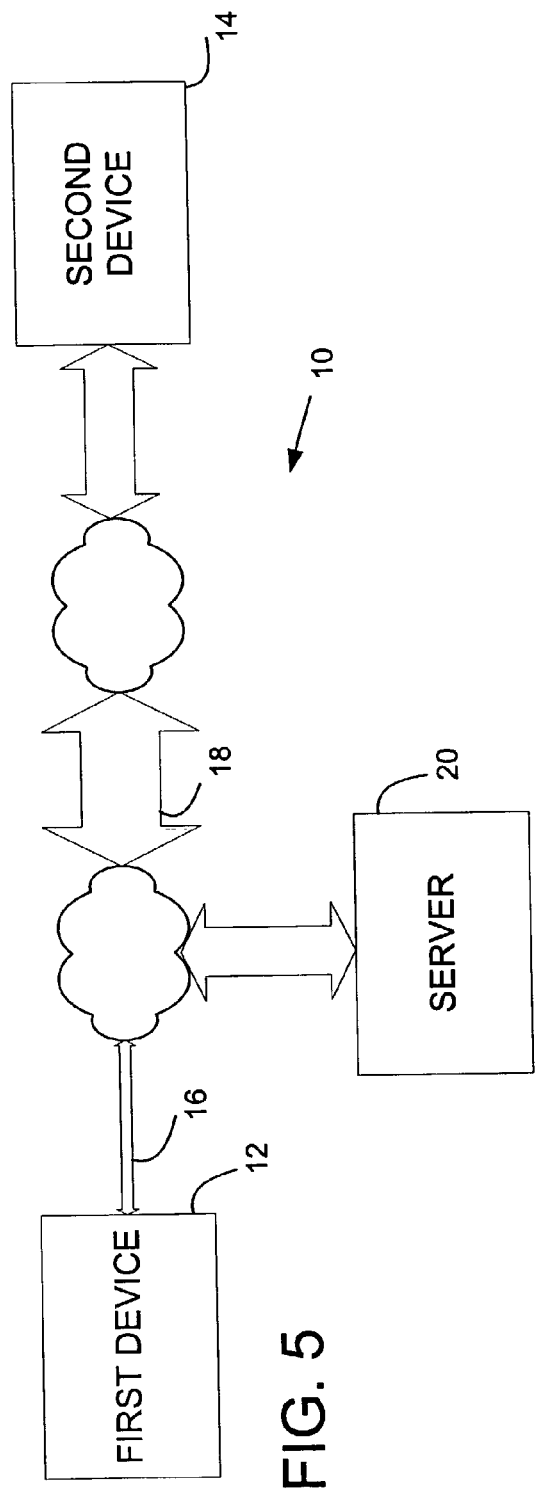
FIG. 5 is a diagram illustrating a network environment in which principles of the present invention may be employed.

Referring to FIG. 5, consider an exemplary network 110 linking two devices—a first device 112 associated with an originating user, and a second device 114 associated with a recipient user. The first device 112 is coupled to the network through a relatively low bandwidth channel, whereas the second device 114 is coupled to the network through a relatively high bandwidth channel. (For example, the first device may be an internet-capable cell phone having low resolution-, still image only-capture capabilities, providing a 9600 baud data channel, or it may be a home PC, with an associated PC or digital single shot camera, coupled to the internet with a 28.8 kbps modem. The second device may be a computer coupled to the internet through a 1.45 megabit per second T-1 line, a cable modem, etc.) The network 110 connecting the two devices includes various links—narrow bandwidth at some parts (e.g., 116), very broadband at other (e.g., internet backbone 118), etc.

Assume the user of device 112 encounters a printed image, e.g., an advertisement in a magazine, that may be of interest to the user of device 112. Using an imaging device (e.g., a CMOS- or CCD-camera built into a cell phone, a flatbed scanner connected to a PC, etc.), device 112 captures an image of the advertisement.

In prior art techniques, the image captured by device 112 would have been sent to device 114 over the network; the image received by the second device would be exactly the image sent by the first device.

Figure 6:
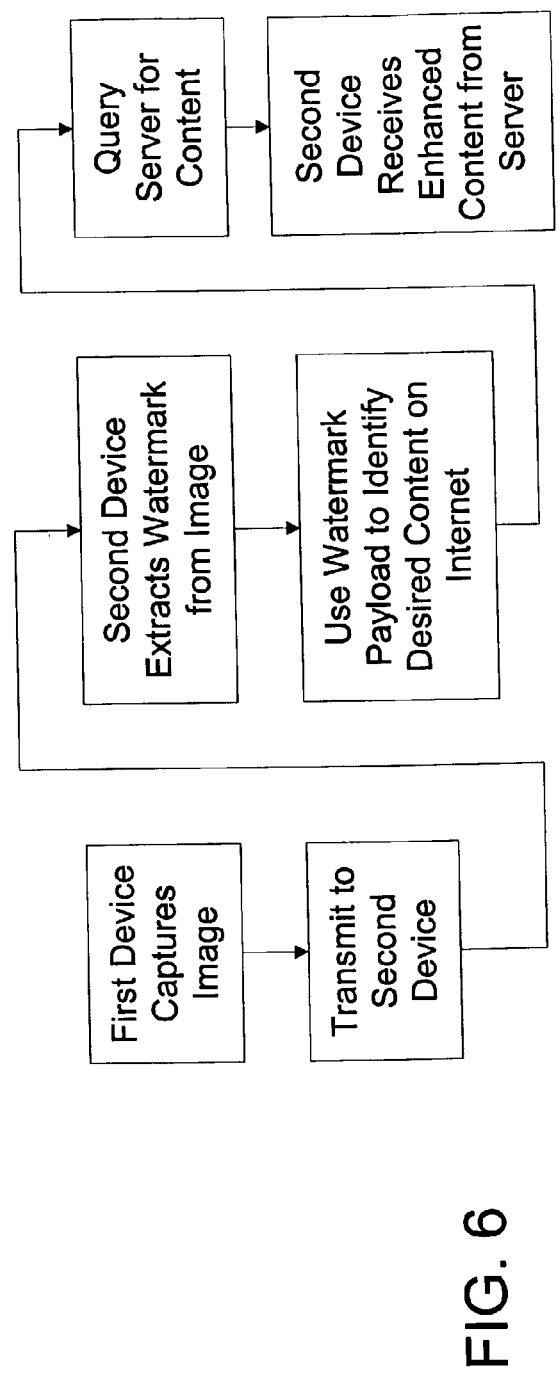
FIG. 6 is a flow chart illustrating aspects of one embodiment.

In accordance with one embodiment, device 114 receives a better image than that sent from device 112. In one such embodiment, device 114 receives the image data captured by device 112. Device 114 recognizes that the image includes a watermark hidden within the image data, and decodes same. The watermark payload includes an index by which a copy of the image can be accessed from a server 120 on the internet or other storage medium. With this index, the second device 114 queries the server 120, which returns the image corresponding to this watermark index (in this case, the advertisement) back to the second device 114. The image provided by the server can be higher resolution or pristine, i.e., it has no artifacts left from scanning at device 112, etc. Such a procedure is shown by the flowchart of FIG. 6.

The watermark payload identifying the sensed image can as long or as short as the application requires. Typically, payloads of between 16 and 64 bits are used, although this is not essential. Shorter payloads have the advantage that they can be more robustly encoded while maintaining a fixed degree of image quality; longer payloads offer a greater universe of identifiers with which the image can be labeled. Illustrative watermarking technology is detailed in the assignee's U.S. Pat. No. 5,862,260, and in copending, application Ser. No. 09/503,881. A great variety of other watermarking arrangements may be used, including those proposed in U.S. Pat. Nos. 5,930,369, 5,933,798, 5,664,018, 5,825,892, 5,940,429 and 5,889,868.

Figure 7:
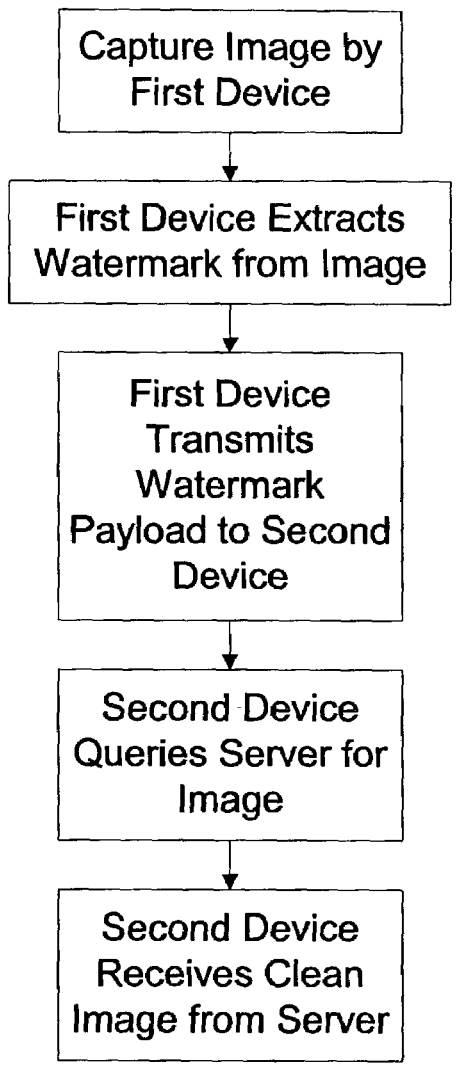
FIG. 7 is a flow chart illustrating aspects of another embodiment.

In accordance with another embodiment of the invention (FIG. 7), the bandwidth bottleneck imposed by narrowband channel 116 (through which device 112 is coupled) is obviated by employing a watermark as a proxy for an image. In such an arrangement, the image data captured by device 112 is decoded, and a watermark payload hidden in the image is extracted. (This can be performed by hardware or software available in device 112, e.g., a cell phone microprocessor, a desktop computer, dedicated decoder circuitry, etc. Alternatively, this decoding can be done remotely from device 112, but before device 114, e.g., by a smart router in the intervening network. In the following discussion, decoding in the device 112 is assumed.) Instead of transmitting the image data over the network, the watermark decoding device (e.g., device 112) simply transmits the watermark payload (or a part thereof). On receipt of the payload, device 114 again queries the server 120, and obtains the image (and/or additional content or functionality, as detailed below), corresponding to that watermark. The image is obtained over the high-speed channel(s) between the server and the second device; the low bandwidth channel linking the first device conveys just the low bandwidth watermark payload information.

By building filters into the low bandwidth devices, upon recognition of a class of watermarks indicating availability of the image as a shared resource, or upon user selection of "transmit only watermark data", the image [or content associated with it via the watermark] can be made available to the message recipient via more capable transmission means.

Figure 8:
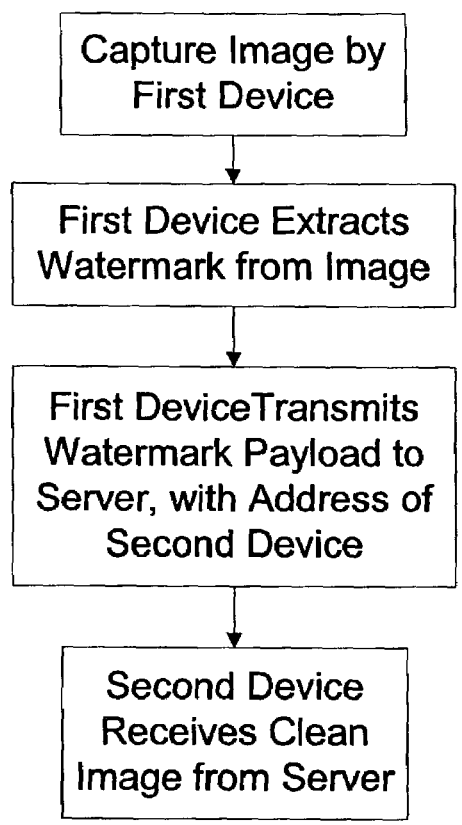
FIG. 8 is a flow chart illustrating aspects of yet another embodiment.

A variant of the foregoing does not transmit the watermark payload to the second device 114. Instead, the payload is dispatched by the first device 112 (or the smart router) directly to the server 120, with instructions that the corresponding desired image be sent to the second device 114. Such an arrangement is shown in FIG. 8. In some applications, the media delivered by the server may be richer than the simple image captured by device 112. For example, the watermark payload in the image captured by device 112 may index one or more files on server 120 that includes video, animation, sound, executable applications, aplets (e.g., JAVA, ActiveX) etc ("enhanced content"). Thus, scanning of a magazine ad at one device can prompt delivery of a video, a Macromedia ShockWave presentation, etc., to the second device.

In some embodiments, the second device 114 identifies to the server 120 its media-playback capabilities. The server 120 can then respond to a watermark-based query with media appropriate to that particular media consumer.

One way the media capabilities of device 114 can be indicated to server 120 is by a data word comprising flag bits, with each set "1" bit indicating a capability. A simplified 8-bit capability word may be as follows:

Bit Capability
0 GIF file display
1 TIFF file display
2 JPEG filed display
3 AVI movie display
4 WAV sound
5 RealAudio sound
6 MP3 sound
7 WindowsMedia The data comprising this word may be automatically compiled on device 114, e.g., from the operating system database with which programs are registered on installation (the Registry database in Windows).

If device 114 sends the capability word 10101100 to server 120, the server knows the device 114 supports GIF and JPEG imagery (but not TIFF), and RealAudio and WAV sound (but not MP3 or WindowsMedia).

If server 120 has media content corresponding to the queried watermark in several supported formats, it can deliver certain ones according to a priority order (e.g., send JPEG if supported; else send GIF if supported; else send TIFF if supported). If the server 120 only has media in a format not supported by the second device 114 (e.g., TIFF in the foregoing example), the server may invoke a conversion routine to perform an on-the-fly conversion to a supported media type (e.g., JPEG) prior to sending to the second device 114.

If the watermark index is provided by the second device 114 (rather than directly from the first device 112), the capability data word can accompany the index.

If the watermark index is provided directly from the first device 112, the server can solicit from the second device 114 a data capability word before responding to the query.

Alternatively, the server can keep, on-file, a database detailing the media capabilities of all known media consumers, and can tailor its query response according to such profile. (The second device 114 can be arranged to automatically inform server 120 of updates to its capability, e.g., each time a new media playback application is registered in the registry database.)

If the server 120 does not know, and cannot discern, the media capabilities of the second device 114, it can provide media in a default form that is most likely to be acceptable (e.g., JPEG, if the content captured by the first device 112 is imagery). From the foregoing description, it will be apparent that embodiments of the present invention provide various advantages over the prior art. One is the dispatch of high bandwidth enhanced content using a low bandwidth channel. Another is the receipt of higher-quality data than that originally captured. Another is delivering applications via low bandwidth channels to recipients by capturing images or watermark data from media content that serve as proxies for the applications.

Having described and illustrated the principles of our invention with reference to a specific embodiment, it will be recognized that the principles thereof can be implemented in other, different, forms.

For example, while examples have been provided with reference to images, the same principles are equally applicable to video and audio.

Similarly, while the foregoing description has made reference to transmitting the watermark, in many implementations, only a part of the watermark need be transmitted. (The watermark may include error correcting information, or other data, not necessary to identify the corresponding data on the server 120.)

Still further, while the detailed embodiment contemplated a still or video camera system for first device 112, much of the functionality of such an image capture system isn't essential to the present invention. Instead, an input device that serves a simpler "watermark capture" function may be used instead. Such a device can omit, e.g., hardware or software components associated with pixel interpolation (commonly used to achieve a desired virtual resolution), formatting (e.g., to provide output in JPEG form), etc. Such components serve useful functions when the resulting imagery is to be displayed or printed, but are superfluous—or detrimental—when the image data is simply to be decoded to extract watermark data.

While examples are provided with reference to steganographic watermark technology for identifying the initial content (i.e., that sensed by device 112), other technologies can alternatively be used. These include data glyphs, 1- and 2-D barcodes, magnetic ink, RF ID tags, UV or IR markings, etc.

While the detailed embodiment contemplated a single server 120 to serve as the repository of content corresponding to watermarks, in other embodiments such a server is implemented in distributed fashion. In some embodiments, one server may act as a default repository, and can dispatch queries to other servers if the first server cannot provide the requested data. Caching of frequently-requested content can be provided at various locations through the network. Additional details on such network configurations can be found in application Ser. No. 09/343,104.

As is familiar to those skilled in the arts, the foregoing methods may be performed using dedicated hardware at devices 112, 114 and 120, and/or through use of processors programmed in accordance with firmware or software, etc. In the latter case the processors may each include a CPU and associated memory, together with appropriate input and output devices/facilities. The software can be resident on a physical storage media such as disks, and can be loaded into the processors' memory for execution. The software includes instructions causing the CPU to perform the various processes detailed above.

Object linking and embedding ("OLE," sometimes also known as dynamic data exchange, or "DDE") is a well-known data processing construct by which a first digital object (e.g., a graph) can be embedded within a second digital object (e.g., a word processing document). In some embodiments, the embedding is static. That is, once the embedding takes place, subsequent changes to the first digital object (e.g., the graph) are not reflected in the second, composite digital object (e.g., the document). In other embodiments, the embedding is dynamic (and thus more commonly termed linking rather than embedding). In such arrangements, if the graph is changed, the document is automatically updated to incorporate the latest version of the graph.

The technology underlying OLE is sophisticated, but is well understood by artisans in the field. Reference may be made to the many U.S. Pat. Nos. (e.g., 5,581,760 and 5,581,686) and reference books (e.g., Brockschmidt, *Inside OLE* 2, Microsoft Press, Redmond, Wash., 1994) on the subject for further details.

OLE-like principles can be implemented using watermark data in digital objects in order to effect object linking or embedding.

In one illustrative embodiment, a photocopier scans an original paper document to produce image data. This image data is analyzed for the presence of watermark data that identifies the graphic(s) on the document. With this watermark identifier, the photocopier can query a remote image database for pristine image data corresponding to the graphic(s) on the document. This pristine data can be relayed from the remote database to the photocopier and substituted into the scanned image data. Output printed from the photocopier is thus based, at least in part, on pristine image data, rather than on image data that has been subjected to various corruption mechanisms (e.g., degradation of the original paper document, artifacts due to scanning, etc.).

Figure 9:
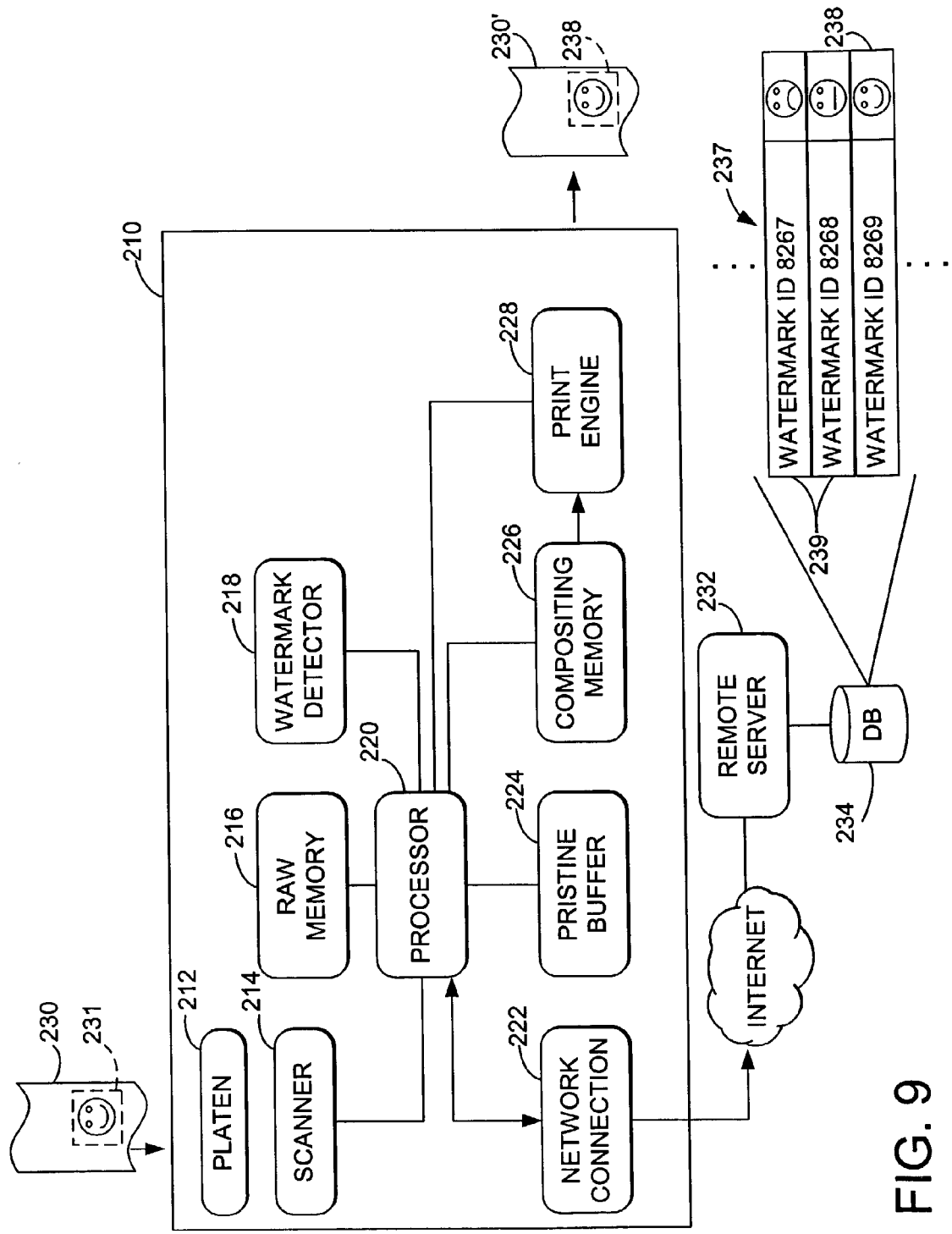
FIG. 9 shows an apparatus according to another embodiment.

Referring to FIG. 9, an illustrative embodiment of the present invention is a photocopier 210. The photocopier includes a platen 212, a scanner assembly 214, a raw data memory 216, a watermark decoder 218, a processor 220, a network connection 222, a pristine image buffer 224, a compositing memory 226, and a reproduction engine 228.

A paper document, such as document 230, is placed on platen 212, and scanner assembly 214 is activated to generate scan data corresponding to the document. The scanner assembly is conventional and may include a linear array of CCD or CMOS sensor elements that optically scans along an axis of the platen to generate 2D image data. Alternatively, the scanner can comprise a 2D array of sensor elements onto which an image of the document is projected through one or more lenses. In the illustrated embodiment, the document 230 includes a picture 231 that is encoded with a plural-bit digital watermark. Document 230 may be referred to as a compound document since it incorporates plural components (e.g., text and picture).

The scan data from the scanner assembly 214 is stored in the raw data memory 216, where it is analyzed for the presence of watermark data by the watermark decoder 218.

There are many different techniques by which imagery can be digitally watermarked and decoded. One is the Digimarc watermark system detailed, e.g., in U.S. Pat. No. 5,862,260, and in pending application Ser. No. 09/452,023, filed Nov. 30, 1999, the disclosures of which are incorporated herein by reference. A great variety of other systems are known. All that is required is that the watermark permit the conveyance of plural-bit auxiliary data without objectionable image degradation.

Upon detection of the watermark in picture 231, the processor 220 is programmed to initiate communication with a remote server 232 (e.g., over the internet) through the network connection 222. The programmed processor sends to the server a query message identifying the detected watermark (which may be, e.g., an identifier of 16–64 bits).

A database 234 at the server 232 searches its records 237 for a digital object indexed by that watermark ID 239 and, if located, causes a pristine version of the object 238 (in this case a pristine version of the picture 231) to be sent to the photocopier.

In the embodiment illustrated, the database has the pristine version of the object stored within the database record for that watermark ID, and relays same directly back to the photocopier. In other embodiments, the object itself is not stored in the database. Instead, the database stores (in a record associated with the watermark ID) the address of a remote data repository at which the pristine object is stored. In this case the object server 232 can transmit an instruction to the remote repository (e.g., again over the internet), requesting the remote repository to provide the pristine object. The object can be sent directly from the remote data repository to the photocopier, or may be relayed through the object server 232. In any case, the pristine object may be provided in TIFF, JPEG, GIF, or other format. (In some embodiment, the request signal from the photocopier specifies the format desired, or may specify plural formats that the photocopier can accept, and the pristine object is then output by the server 232 or remote repository in such a format. In other embodiments, the request signal from the photocopier does not include any format data.)

In some embodiments, the object server 232 can be of the sort more particularly detailed in copending applications 60/164,619 (filed Sep. 10, 1999), and Ser. No. 09/343,104 (filed Jun. 29, 1999), the disclosures of which are incorporated herein by reference.

In addition to detecting the ID of any watermark in the scanned image data, the photocopier's watermark detector also discerns the placement of the watermarked picture within the document image, and its state (e.g., size, rotation, etc.), and produces corresponding state information. In some embodiments, this state information is passed to the object server 232, permitting the pristine object 238 to be sized/rotated/etc. (e.g., by the object server) to match the object detected in the document image. In other embodiments, a generic version of the pristine object is passed back to the photocopier, and the processor 220 attends to sizing, rotating, etc., of the pristine picture 238 as necessary to match that of the original picture 231.

In some embodiments the picture 231 in the paper document has been cropped. (The watermark can nonetheless be detected from the cropped image.) When the pristine picture 238 is received from the remote location, it can be pattern-matched to the picture 231 detected in the original document to determine the cropping boundaries (if any), and corresponding cropping of the pristine picture can be effected.

Once the foregoing scaling/rotation/cropping, etc., adjustments (if any) have been made on the pristine picture 238 stored in buffer 224, the processed pristine picture is combined with the original document scan data in compositing memory 226, yielding a composite document image that includes the pristine picture data 238 in lieu of the scanned picture 231. (The substitution of the pristine picture for the original picture data can be accomplished by various known image processing techniques, including masking, overwriting, etc.) The composite document image is then passed to the reproduction engine 228 to produce a hard-copy output (i.e., an enhanced compound document 230') in the conventional manner. (The reprographic engine 228 can take many different forms including, e.g., xerography, ink-jet printing, etc.)

The pristine picture 238 received from the server 232 can, itself, be watermarked or not. If watermarked, the watermark will usually convey the same payload information as the watermark in the original picture 231, although this need not always be the case. In other embodiments, the pristine picture 238 received from the remote server 232 has no watermark. In such case the pristine picture can be substituted into the compound document 230 in its unwatermarked state. Alternatively, the apparatus 210 can embed a watermark into the picture prior to (or as part of) the substitution operation.

If the substituted picture is watermarked, this permits later watermark-based enhancement or updating. For example, if the enhanced compound document 230' including the pristine picture 238 is printed by the photocopier, and the resulting photocopy is thereafter photocopied, the latter photocopying operation can again substitute pristine picture data for the scanned picture data produced by the second photocopier's scanner. Moreover, in applications where it is appropriate for a picture to be updated with the latest version whenever printed, the watermarking of the picture 238 permits substitution of a latest version whenever the document is scanned for printing.

In other situations, it is desirable for the picture 238 included in the enhanced compound document 230' to be unwatermarked. This is the case, for example, in certain archival applications where it is important that the document 230' not be changed after archiving. By assuring that the picture 238 is not watermarked, inadvertent changing of the picture in subsequent photocopying can be avoided. (In cases where the pristine image 238 is provided from server 232 in a watermarked state, the photocopier may remove or disable the watermark in response to corresponding instructions from a user through a user interface or the like.)

From the foregoing, it will be recognized that the illustrative embodiment can produce "photocopies" that are better than the "originals." This is accomplished by watermark-based substitution of pristine digital objects to replace less pristine counterparts.

While this example embodiment is particularly illustrated with reference to a photocopier, the same principles are equally applicable in other systems, including personal computers (e.g., in conjunction with image editing software, such as Adobe Photoshop). In such case the input image data needn't come from a scanner but may come, e.g., from a digital file, from a network location, etc.

Likewise, while the embodiment is particularly illustrated with reference to picture (i.e., graphic) data, the same principles are equally applicable in connection with other data types, such as video, sound, text, etc. Moreover, the reference to "documents" is illustrative only; the invention can similarly be employed with any compound object that includes a watermarked component—whether in digital or analog form.

While the detailed embodiment is described as using separate raw data memory 216, pristine image buffer 224, and compositing memory 226, more typically some or all of these functions are served by a single memory, which may be a computer system's main RAM memory.

Likewise, while the detailed embodiment employs a processor 220 programmed in accordance with software instructions (e.g., stored in a memory or on a storage medium), in other embodiments some or all of the described functionality can be achieved using dedicated hardware (e.g., ASICs), or programmable hardware (e.g., PLAs).

Still further, while the embodiment is illustrated with reference to an arrangement in which a document includes a single watermarked photograph, it will be recognized that plural such watermarked components may be present in a compound document, and the system may be arranged to obtain pristine versions of each, and edit/composite same as necessary as to recreate an enhanced version of the original document.

Moreover, while the illustrative embodiment contemplates that a watermarked photograph may be a component of the original document, in other embodiments the watermarked object may comprise the entirety of the original document.

While reference has been made to substitution of pristine image components, in some embodiments it may be desirable to substitute components that are not "pristine." Indeed, in some embodiments an object may be substituted that is visually dissimilar to the original object. Consider artwork for a Christmas card. The artwork may include a watermarked "generic" corporate logo. When encountered by a computer according to the present invention, the generic logo may be replaced with a logo corresponding to the corporate owner of the computer. In such case, the substitute imagery may be stored within the computer itself, obviating the need for any network connection. The registry database maintained by the computer's operating system may include keys defined by watermark IDs. When a watermark ID is encountered, the registry database can be consulted to identify a corresponding graphic that can be substituted into the object being processed. If none is found, the watermark ID can be passed to the remote server 232.

While, for expository convenience, the illustrative embodiment was described as always substituting pristine data when available, more typically this is a function that would be enabled or disabled by an operator of the device, e.g., by an appropriate switch, button, or user interface control. In some embodiments, the device may be arranged to query the user when substitution of a pristine component is possible, in some cases presenting the user with a depiction of the image component proposed to be substituted.

The illustrative embodiment may be said to employ watermark-based object embedding, since the hard-copy output is static (i.e., cannot change) after printing. In other embodiments, the enhanced compound document 230' is not printed, but stored. Each time the compound document is utilized (e.g., opened for editing, or printed), any watermarked component(s) therein can be updated to include the latest-available version(s) of the watermarked component(s). In such case, the document may be said to employ watermark-based object linking.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above. These patents and patent applications provide additional implementation details. They describe ways to implement processes and components of the systems described above. Processes and components described in these applications may be used in various combinations, and in some cases, interchangeably with processes and components described above.

The particular combinations of elements and features in the above-detailed embodiments are exemplary only; the interchanging and substitution of these teachings with other teachings in this and the incorporated-by-reference patents/applications are also contemplated.

We claim:

1. A method of operating a portable device that includes a sensor to capture image or audio data, comprising:
    transferring the captured data to a remote device;
    decoding a watermark at the remote device; and
    returning corresponding data to the portable device.

2. The method of claim 1 in which the corresponding data is decoded watermark data.

3. The method of claim 1 which further includes indexing a database with reference to at lease a portion of the decoded watermark to obtain a computer address corresponding thereto, and returning the computer address to the portable device.

4. The method of claim 1 which further includes indexing a database with reference to at least a portion of the decoded watermark to obtain a computer address corresponding thereto, and receiving content data from said computer address at a destination device.

5. The method of claim 4 in which the destination device is co-located with the portable device.

6. The method of claim 5 in which the destination device comprises the portable device.

7. The method of claim 4 in which the destination device is remote from the portable device.

8. The method of claim 1 in which the transferring step occurs autonomously, without user intervention.

9. The method of claim 1 in which a user initiates the transferring step by performing an action.

10. The method of claim 9 in which the user initiates the transferring step by operating a button.

11. The method of claim 1 in which the corresponding data is audio or image data like that captured by the portable device sensor, but of higher fidelity.

12. The method of claim 1 in which the corresponding data is audio or image data that is not simply a higher fidelity version of the audio or image data captured by the portable device sensor.

13. A cell phone for performing the method of claim 1.

14. A method of operating a portable device that includes a sensor to capture image or audio data, comprising:

decoding watermark data from the image or audio data, the watermark serving to identify corresponding content stored in a repository; and transferring at least a portion of the watermark data to a remote device, and sending instruction data with said watermark data, said instruction data serving to specify an action to be taken with the content stored in the repository.

15. The method of claim 14 in which the action is transmission of the content from the repository to the portable device.

16. The method of claim 14 in which the action is transmission of the content from the repository to a destination remote from the portable device.

17. The method of claim 14 in which the instruction data depends, at least in part, on the bandwidth of a network connection available to link the portable device to another device.

18. The method of claim 14 in which said content is audio or image data like that captured by the portable device sensor, but of higher fidelity.

19. The method of claim 14 in which said content is audio or image data that is not simply a higher fidelity version of the audio or image data captured by the portable device sensor.

20. A method of operating a device that includes a sensor to capture image or audio data, comprising:

capturing image or audio data with the sensor;

decoding a digital watermark from the captured data;

using the digital watermark to fetch a pristine version of the captured data;

substituting the pristine version for at least a part of the captured data to create a new data object; and rendering the new data object on an output device.

21. In a digital audio device that includes a sensor to capture image or audio data, a method comprising:

transferring the captured data to a remote device for extraction of a digital watermark at the remote device; and returning corresponding data to the digital audio device.

22. The method of claim 21 wherein the digital audio device comprises a wireless telephone.

23. The method of claim 22, wherein said transferring comprises wirelessly transferring.

24. In a digital audio device that includes: i) a sensor to capture image or audio data, and ii) a digital watermark decoder, a method comprising:

receiving captured data from the sensor, the captured data comprising a digital watermark embedded therein, the digital watermark including at least auxiliary data;

decoding the digital watermark with the digital watermark decoder to obtain the auxiliary data;

wirelessly transferring the auxiliary data to a remote device; and receiving from the remote device data corresponding to the auxiliary data.

25. The method of claim 24, wherein the digital audio device comprises a wireless telephone.

26. The method of claim 24, wherein the digital watermark is embedded in the data through modifications of the image or audio data.

27. The method of claim 24, wherein the image or audio data comprises a carrier, and the digital watermark is embedded in the carrier through modifications of the carrier.

28. A wireless reception device sized for fitting in a user's pocket or purse, said wireless reception device comprising:

a battery to power said wireless reception device;

a sensor to capture image or audio data;

electronic memory circuitry; and electronic processing circuitry, wherein said electronic memory circuitry includes executable programming instructions stored therein for execution on said electronic processing circuitry, said executable programming instructions comprising a steganographic decoder for discerning auxiliary data steganographically embedded in data captured by said sensor, said executable programming instructions further comprising instructions to control some aspect of said wireless reception device, and wherein the aspect involves the auxiliary data.

29. The wireless reception device of claim 28, wherein said wireless reception device comprises a wireless telephone.

30. The wireless reception device of claim 28, wherein said electronic processing circuitry comprises a microprocessor.

31. The wireless reception device of claim 28, wherein said steganographic decoder comprises a digital watermark decoder.

32. The wireless reception device of claim 31, wherein the steganographically embedded auxiliary data comprises a digital watermark, and wherein the digital watermark is embedded in the data captured by said sensor through modifications of the data.

* * * * *